(12) United States Patent
Otsuka

(10) Patent No.: US 6,567,080 B1
(45) Date of Patent: May 20, 2003

(54) IMAGE DISPLAY APPARATUS AND CONTROL METHOD THEREOF

(75) Inventor: Hiroshi Otsuka, Tokyo (JP)

(73) Assignee: NEC-Mitsubishi Electric Visual Systems Corporations, Tokyo (JP)

( * ) Notice: Subject to any disclaimer, the term of this patent is extended or adjusted under 35 U.S.C. 154(b) by 0 days.

(21) Appl. No.: 09/573,639

(22) Filed: May 17, 2000

(30) Foreign Application Priority Data

Oct. 4, 1999 (JP) .......................................... 11-282880

(51) Int. Cl.$^7$ ................................................ G09G 5/00
(52) U.S. Cl. ...................... 345/211; 315/94; 315/105; 348/730; 713/323
(58) Field of Search .......................... 345/211, 11, 212; 713/300, 320, 323; 313/364–482; 315/101, 105, 107, 94, 380; 348/730

(56) References Cited

U.S. PATENT DOCUMENTS

| | | | |
|---|---|---|---|
| 5,130,606 A | * 7/1992 | Morrish et al. | ............. 315/107 |
| 5,579,252 A | * 11/1996 | Huang | ........................ 364/707 |
| 5,648,799 A | 7/1997 | Kikinis | |
| 5,808,693 A | 9/1998 | Yamashita et al. | |
| 5,944,830 A | * 8/1999 | Hong et al. | .................. 713/324 |
| 6,049,880 A | * 4/2000 | Song | ........................... 713/300 |
| 6,054,981 A | * 4/2000 | Kimoto et al. | ............... 345/211 |
| 6,084,355 A | 7/2000 | Park | |
| 6,104,174 A | * 8/2000 | Ota et al. | .................... 323/235 |

FOREIGN PATENT DOCUMENTS

| | | |
|---|---|---|
| JP | A348282 | 3/1991 |
| JP | A816122 | 1/1996 |
| JP | A1097356 | 4/1998 |
| JP | 10-191211 | 7/1998 |
| WO | WO 99/52340 | 10/1999 |

* cited by examiner

Primary Examiner—Steven Saras
Assistant Examiner—Fritz Alphonse
(74) Attorney, Agent, or Firm—Birch, Stewart, Kolasch & Birch, LLP

(57) ABSTRACT

In an image display apparatus, based upon such a relationship among previously measured power consumption in a power save mode, an application voltage and application time thereof, and also rising time of a screen when the power save mode is released, a heater application voltage and application time of this heater application voltage are calculated in order to realize power consumption and rising time, which are required with respect to each of modes. Based upon the calculation results, either a duty ratio of a switched voltage or application time of this heater application voltage are controlled. At the same time, when the power save mode is released, a higher voltage than the heater application voltage in the normal display mode is applied only for the calculated time period.

12 Claims, 20 Drawing Sheets

FIG. 18

RELATIONSHIP AMONG HORIZONTAL/VERTICAL SYNC SIGNALS AND POWER SAVE MODE

| DISPLAY STATE | HORIZONTAL SYNC SIGNAL | VERTICAL SYNC SIGNAL | PICTURE SIGNAL | RATED POWER | RECOVERY TIME |
|---|---|---|---|---|---|
| UNDER NORMAL USE | YES | YES | YES | — | — |
| STANDBY MODE | NO | YES | NO | — | — |
| SUSPEND MODE | YES | NO | NO | ≤15W | ≤3S |
| POWER OFF MODE | NO | NO | NO | ≤5W | — |

IMAGE DISPLAY APPARATUS AND CONTROL METHOD THEREOF

BACKGROUND OF THE INVENTION

1. Field of the Invention

The present invention generally relates to an image display apparatus connected to a computer and the like. The present invention is directed to a control operation of heater-consumed electric power of a CRT (cathode-ray tube) display apparatus equipped with a power management function capable of reducing unnecessary power consumption, and also another control operation of rising time of a screen of this CRT display apparatus.

2. Description of the Related Art

In general, image display apparatuses own power management functions capable of saving power consumption thereof. As one of these power management functions, as indicated in FIG. 18, the DPMS (Display Power Management System) of VESA (Video Electronics Standard Association) has been proposed. This DPMS is capable of saving power consumption in such a manner that a use state requested by a computer is detected by checking as to whether or not a sync signal is present, and while electric power consumed in an image display apparatus is reduced in a step manner, desirable reduced power consumption can be realized.

Also, in response to the use state requested by the computer, which is detected by checking as to whether or not this sync signal is present, the image display apparatus is brought into a pause state (suspend mode) under which recovery time (image appearing time) is defined, and also a power-OFF state (power-OFF mode) under which recovery time is not defined. Moreover, the power consumption of the respective states is separately defined based upon the Energy Star Program of U.S. Environment Protection Department and the Swedish National Board for Industrial and Technical Development (in general, referred to as a "TCO").

In a conventional image display apparatus shown in FIG. 19, various sorts of power reducing modes are determined based upon the above-explained standards by combining signals with each other as to whether or not a horizontal sync signal, a vertical sync signal, and a picture signal are present, which are supplied from a computer and the like. In this conventional image display apparatus, several sorts of power reducing operations are carried out.

FIG. 19 is a schematic block diagram for indicating an internal arrangement of a conventional image display apparatus. In this drawing, reference numeral 1 designates a signal generating apparatus such as a computer, reference numeral 2 designates an image display apparatus, and reference numeral 3 designates a power save mode detecting section for detecting a use state requested by the signal generating apparatus 1 by checking as to whether or not the sync signal sent from the signal generation apparatus 1 is present, and for setting a power save mode in response to this detected use state. Also, reference numeral 11 designates a heater ON/OFF control unit for controlling a heater-power-supplying control section 6 (will be discussed later) in response to the detection signal detected from the power save mode detecting section 3 so as to turn ON/OFF heater electric power. Reference numeral 5 designates a power supplying section for supplying the electric power to the heater. Reference numeral 6 designates a heater-power-supplying control section for controlling the heater electric power entered from the power supplying section 5 in response to the ON/OFF control signal supplied from the heater ON/OFF control unit 11, and reference numeral 7 designates a CRT for displaying thereon an image by receiving the heater electric power supplied from the heater-power-supplying control section 6, and for containing a heater 71.

Next, operations of the conventional image display apparatus 2 will now be explained. The conventional image display apparatus 2 performs the power management operation in accordance with the use state requested by the computer by detecting a power-save-requesting signal (for example, checking as to whether or not sync signal is present) sent from the signal generating apparatus 1. In particular, when the power OFF mode is set in which the recovery time (namely, time duration defined until an image appears on image display apparatus 2) from the execution of the power management operation is not restricted, supplying of the electric power to the CRT heater 71 is stopped. At this time, an OFF signal is supplied from the heater ON/OFF control unit 11 to the heater-power-supplying control section 6. At this time, while a resistor 616 is used, such a lower voltage than the heater voltage during the normal display operation is applied to the heater 71 so as to shorten the rising time of the screen.

On the other hand, when the normal display mode, the stand-by mode, and the suspend mode are set, the ON signal is outputted from the heater ON/OFF control unit 11. This ON signal may turn ON the NPN transistor 61 of the heater-power-supplying control section 6, so that the base current of the PNP transistor 62 may flow to turn ON this PNP transistor 62. As a result, the voltage drvied from the power supply section 5 is applied via the PNP transistor 62 to the heater 71 of the CRT 7.

FIG. 20 represents variations in the heater voltage before/after the power save mode is released in the conventional preheat type image display apparatus 2. When the power save mode is selected, the voltage lower then the heater voltage in the normal display mode is applied to the heater within such a range defined by the allowable power consumption so as to preheat this heater to a certain warning temperature, so that the rising time of the screen may be shortened. The optimum heater voltage is applied to the heater immediately after the power save mode is released.

Also, Japanese Patent Unexamined Publication No. Hei. 3-48282 describes another conventional image display apparatus operated as follows: That is, in the power save mode, while the temperature of the heater is measured by employing the temperature sensor, the electric power is supplied to this heater in such a case that the measured temperature is lowered over a predetermined temperature range. Thus, since the temperature of the heater is increased, the temperature of the heater is controlled within a constant temperature range lower than the heater temperature in the normal display mode. This conventional system is featured by that while the heater voltage is ON/OFF-controlled, the ON/OFF-controlled heater voltage is applied in a discontinuous mode.

Since the conventional image display apparatuses are constructed of the above-described arrangements, there are the below-mentioned problems.

As the circuit for reducing the electric power in the power-OFF mode, there is only such an ON/OFF circuit for controlling the supply of the heater voltage to the CRT heater. Therefore, both the power consumption in the power-OFF mode and also the recovery time from the power-OFF mode cannot be freely set by the user. Also, there is another problem that lengthy time is required until the image appears on the screen.

Furthermore, Japanese Patent Unexamined Publication No. Hei. 3-48282 discloses that the control operation is carried out while observing the temperature of the CRT heater. However, the temperature of the heater would be changed with a certain temperature range, depending upon the manufacturing precision of the sensor, so that the recovery time cannot become constant. Also, there is another problem that since the heater supply power in the power save mode must be increased in order to shorten the recovery time, the power consumption would be increased.

SUMMARY OF THE INVENTION

The present invention has been made to solve the above-described problems, and therefore, has an object to provide such an image display apparatus. That is, based upon both present power consumption in a power save mode and preset screen rising time when the power save mode is released, a calculation is made of optimum heater voltages and also optimum heater voltage application time in the respective modes. Then, an effective value (root-mean-square value) of a signal entered into the heater is controlled based upon the calculation result. More specifically, when the power save mode is released, this effective value is controlled in such a manner that this effective value may become a higher voltage than the optimum heater voltage in the normal display mode, or at least the same voltage as this heater voltage. As a consequence, both the power consumption in the power save mode and the screen rising time when the power save mode is released can be freely controlled.

In order to achieve the above object, according to the invention, there is provided an image display apparatus comprising: power save mode detecting means for detecting a power-save request or a power-save release; power consumption/image-appearing-time control means for controlling both power consumed in a power save mode and rising time of a screen when the power save mode is released; power supplying means for supplying electric power to a heater of a display unit on which an image is displayed; and heater-power-supplying control means for controlling the electric power supplied from the power supplying means based upon a control signal outputted from the power consumption/image-appearing-time control means so as to supply predetermined electric power to the heater of the display unit.

Further, according to the invention, there is provided a method for controlling an image display apparatus, comprising: a setting step for setting both a power saving amount and rising time of a screen; a power-save detecting step for detecting either a power-save request or a power-save release; a calculating step for calculating a value of a first voltage applied to a heater in a power save mode, a value of a second voltage applied to the heater when the power save mode is released and application time of the first and second voltages based upon the set values; a control signal converting step for outputting a control signal based upon the first voltage value, the second voltage value, and the application time; and a heater-power-supplying control step for supplying predetermined electric power to the heater in response to the control signal.

BRIEF DESCRIPTION OF THE DRAWINGS

FIG. 18 is a table for representing a relationship among the horizontal sync signal, the vertical sync signal, the picture signal, and the power save mode.

DETAILED DESCRIPTION OF THE PREFERRED EMBODIMENTS

Figure 1:
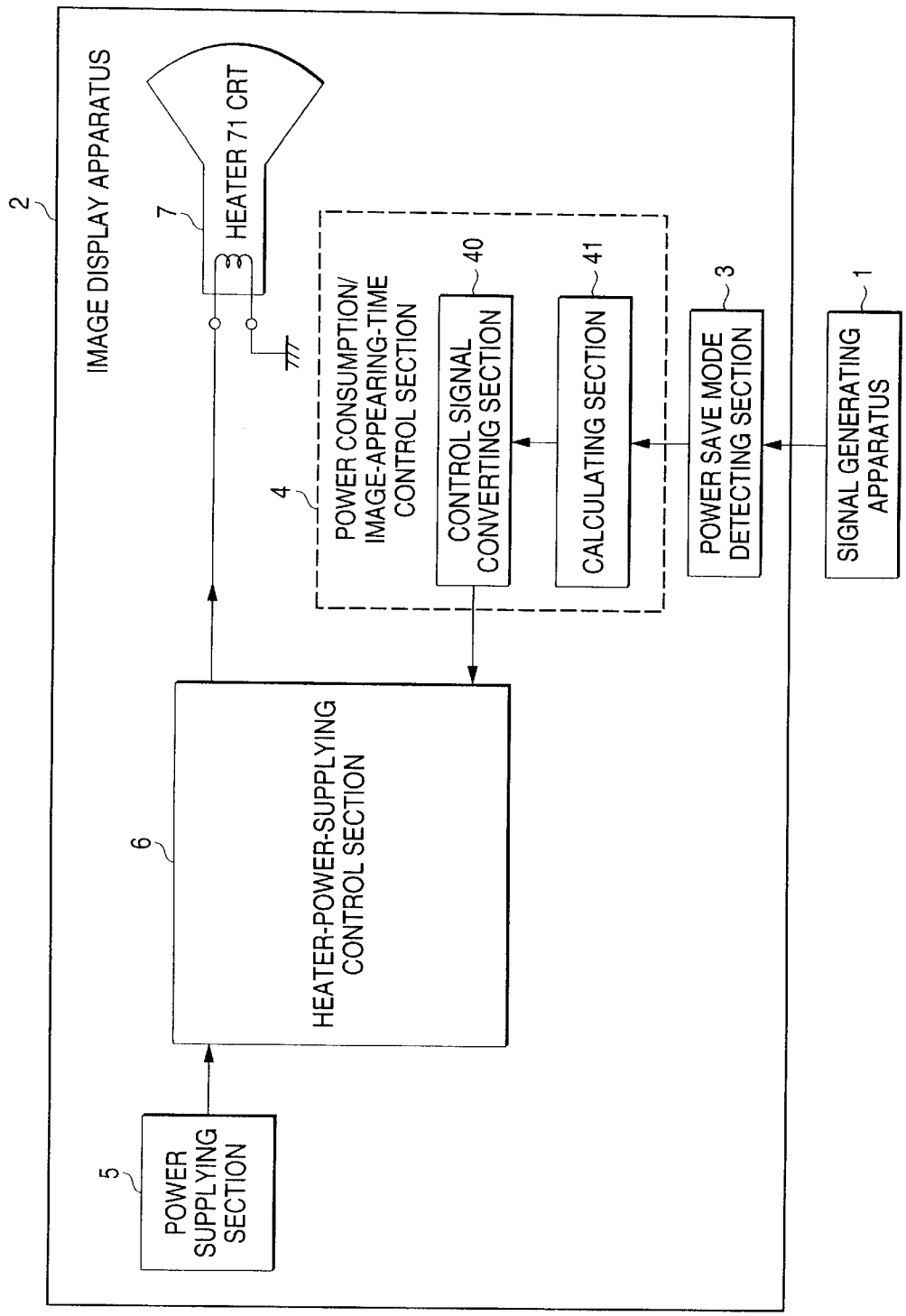
FIG. 1 is a general block diagram of an image display apparatus for indicating an embodiment 1 of the present invention.

An image display apparatus according to the present invention will now be concretely described with reference to a drawing indicative of an embodiment thereof. It should be noted that the same reference numerals explained in the related art will be employed as those from denoting the same, or similar structural elements of the embodiment.

Embodiment 1

An embodiment 1 of the present invention will now be described with reference to the drawings. FIG. 1 is a schematic block diagram for indicating a generic arrangement of an image display apparatus according to the present invention. In this drawing, reference numeral 1 designates a signal generating apparatus for generating display image, display timing, and a synchronization (sync) signal indicative of a power save mode. Reference numeral 2 designates an image display apparatus for receiving the signals derived from this signal generating apparatus 1 to display an image, and reference numeral 3 designates a power save mode detecting section for receiving the sync signal and the video signal (picture signal), which are generated from the signal generating apparatus 1, so as to judge a use state requested by a computer (not shown) and thus to set a power save mode in response to this judged used state. Also, reference numeral 41 designates a calculating section for calculating both optimum power consumption and optimum image appearing time in response to a state of a power save mode, and reference numeral 40 designates a control signal converting section for converting these calculation results into such a control signal suitable for a heater-power-supplying control section 6 (will be discussed later) to thereby output this control signal to the heater-power-supplying control section 6. Reference numeral 4 designates a power consumption/image-appearing-time control section constructed of the above-explained calculating section 41 and control signal converting section 40, and corresponds to a major unit of the present invention.

Also, reference numeral 5 designates a power supplying section which constitutes a power supply capable of supplying electric power to a heater of a CRT. Reference numeral 6 designates a heater-power-supplying control section for receiving the control signal outputted from the power consumption/image-appearing-time control section 4 and also for controlling the electric power of the power supplying section 5 based upon this control signal to thereby supply the controlled electric power to the heater of the CRT. Reference numeral 7 designates a CRT (cathode-ray tube) for displaying thereon a picture in response to the picture signal received from the signal generating apparatus 1. This CRT 7 contains a heater 71 capable of heating the cathode of the CRT 7. It should also be noted that a deflection circuit, a high voltage generating circuit, a picture signal output circuit, and the like are built in the image display apparatus 2.

Figure 2:
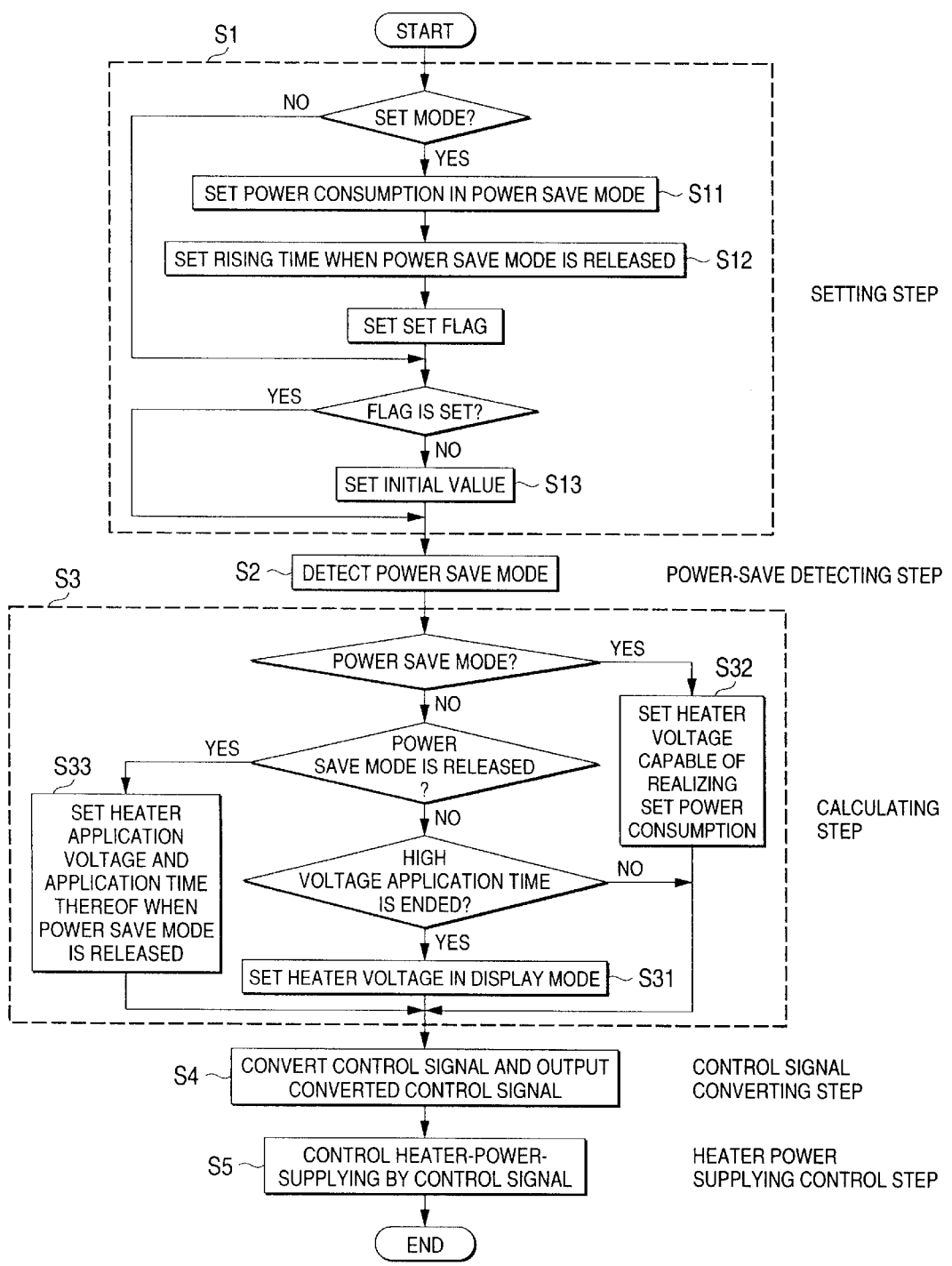
FIG. 2 is a general flow chart for explaining a control method of the image display apparatus for showing the embodiment 1 of the present invention.

Next, operations of the image display apparatus 2 will now be described with reference to FIG. 1 and FIG. 2. FIG. 2 is a flow chart for describing a control method of the image display apparatus 2 according to this embodiment 1 of the present invention. First, in a setting step (S1), the image display apparatus 2 sets power consumption in a power save mode, which is required by a user, by way of a communication section between an OSD and the signal generating apparatus at step S11, and also sets rising time (requested by the user) of a screen when the power save mode is released at step S12. When these values are not yet set, this image display apparatus 2 sets initial values.

Next, in a power-save detecting step (S2), upon receipt of both a picture signal (video signal) and a sync (synchronization) signal, which are outputted from the signal generating apparatus 1, the power save mode detecting section 3 detects a use state which is requested by the signal generating apparatus 1, and then sets such a power save mode in accordance with this detection result. As the power save mode detecting method, there are many detecting methods by utilizing the VESA standard, by checking as to whether or not an image signal is present, and also by checking a time period during which a key operation is not made.

Subsequently, in a calculating step (S3), in response to the detection signal outputted from the above-described power save mode detecting section 3, the calculating section 41 of the power consumption/image-appearing-time control section 4 executes calculations corresponding to the below-mentioned modes. First, when the normal display mode is selected, the power consumption/image-appearing-time control section 4 sets control data in such a manner that a proper heater voltage is continuously applied to the heater (S31). When the power save mode is selected, the power consumption/image-appearing-time control section 4 sets control data in such a manner that the power consumption becomes preset power consumption in the power save mode (S32).

Also, when the power save mode is released, based upon both the preset power consumption in the power save mode and the preset rising time of the screen, the calculating section 41 calculates both a heater application voltage and application time thereof in order to realize this rising time of the screen from a relationship among previously-measured power consumption in the power save mode, a heater application voltage when the power save mode is released, and the rising time of the screen when the power save mode is released. Based upon this calculation result, the power consumption/image-appearing-time control section 4 sets control data by which both the heater voltage and the heater voltage application time are controlled (step S33), and thereafter transfers the set control data to the control signal converting section 40.

At the next control signal converting step (S4), the control signal converting section 40 converts the control data which is calculated/set by the calculating section 41 into either a switching control signal or an analog level control signal, which correspond to the heater-power-supplying control section 6. Then, the control signal converting section 40 supplies the converted control signal to the heater-power-supplying control section 6.

Next, in a heater-power-supplying control step (S5), the control signal for controlling both the heater voltage and the application time is received by the heater-power-supplying control section 6. Then, this heater-power-supplying control section 6 controls a power supply voltage entered from the power supplying section 5 in response to this control signal to thereby apply the controlled voltage to the heater 71 of the CRT 7. Since the control operations are carried out in the above-explained manner, both the power consumption and the rising time of the screen in the power save mode can be arbitrarily set. In such a case that the rising time of the screen is fast, the heater-power-supplying control section 6 is featured by that as the heater application voltage when the power save mode is released, such a high voltage can be applied to the heater 71 of the CRT 7. That is, this heater application voltage is higher than the proper heater voltage applied to the heater 71 when the normal display mode is selected.

Figure 3:
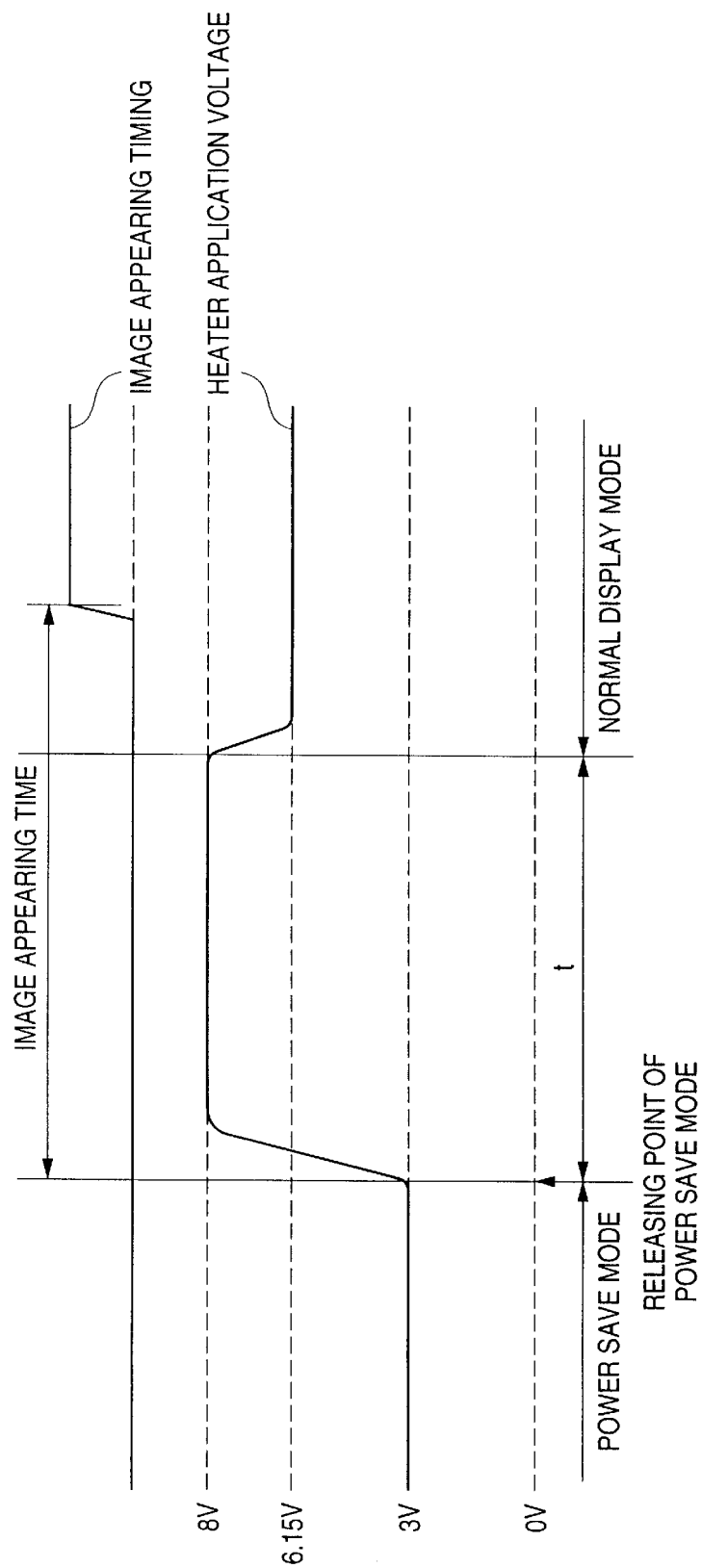
FIG. 3 is a timing chart for indicating a variation in heater application voltages before/after a power save mode is released in the embodiment 1 of the present invention.

FIG. 3 graphically represents general variations in the heater voltages before/after the power save mode is released in accordance with the present invention. As seen from this variation state, since the higher voltage than the normal heater voltage is applied to the heater 71 for a time period "t" after the power save mode is released, the heating speed of this heater 71 is increased, so that the rising time of the screen can become fast, or can be shortened. Since the image display apparatus according to this embodiment 1 is controlled in the above manner, both the power consumption and the rising time of the screen can be freely controlled.

Embodiment 2

Next, a description will now be made of an embodiment 2 of the present invention. This embodiment 2 discloses that a switched voltage is applied to the heater 71. Specifically speaking, in accordance with an image display apparatus of this embodiment 2, electric power is controlled by controlling a duty ratio of the switched voltage. This operation will now be described with reference to a circuit arrangement shown in FIG. 4.

Figure 4:
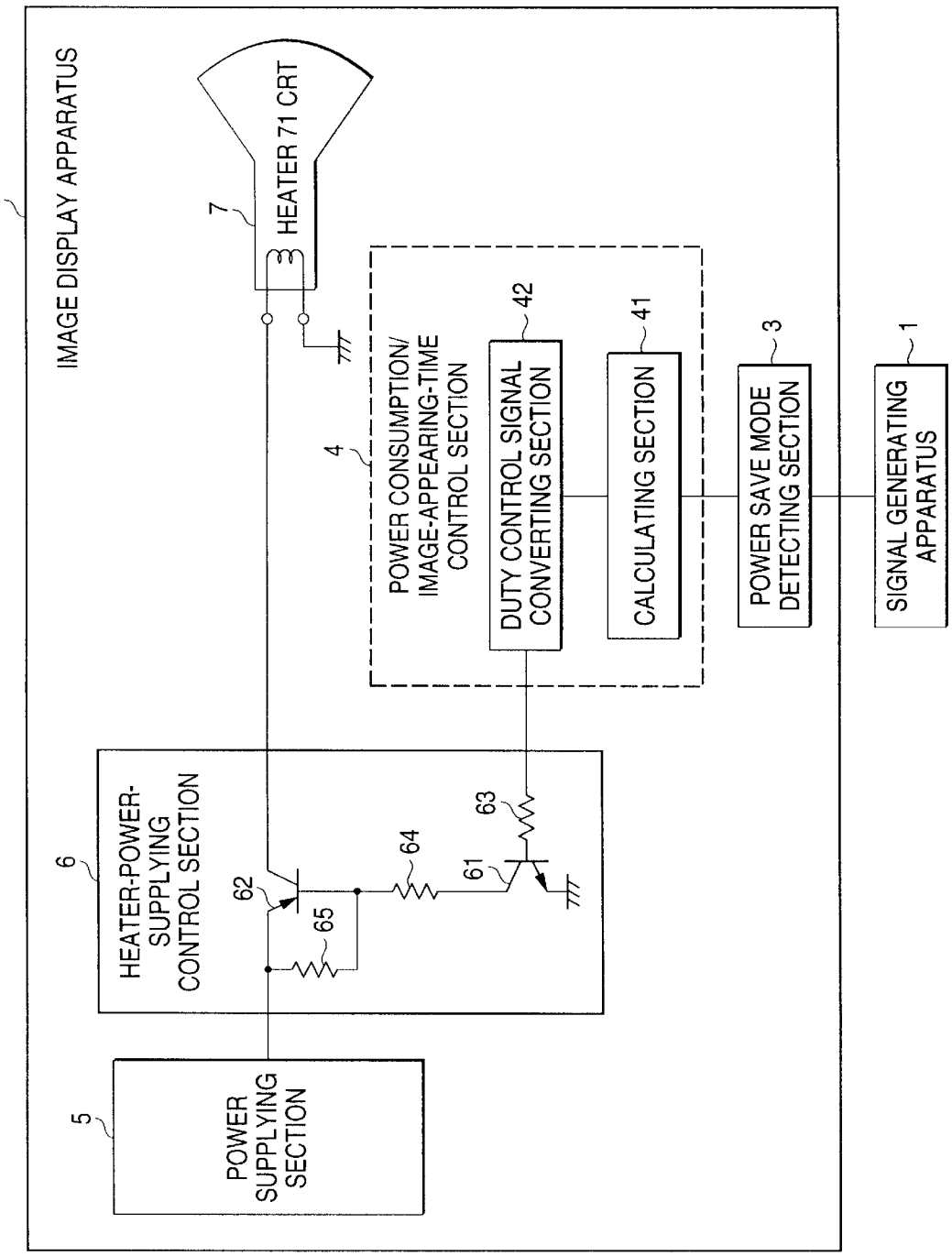
FIG. 4 is a detailed block diagram of an image display apparatus for representing an embodiment 2 of the present invention.
Figure 5:
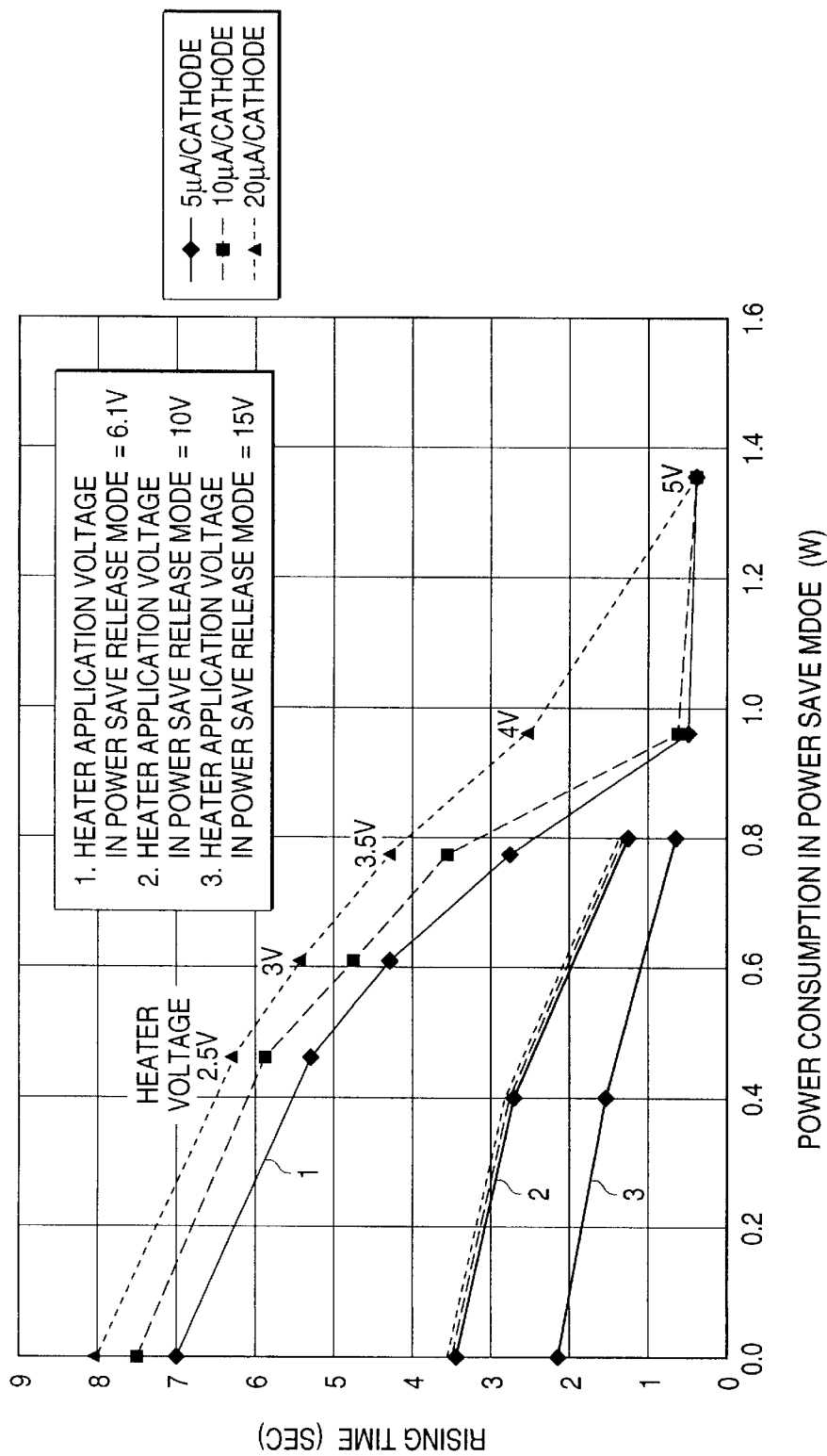
FIG. 5 is a diagram for showing a relationship among power consumption in the power save mode, a heater application voltage when the power save mode is released, rising time of a screen, which constitute basic calculation elements of the present invention.

FIG. 4 is a schematic block diagram for showing an arrangement of an image display apparatus operated in such a case that electric power supplied to a heater is controlled by controlling a duty ratio of a switched voltage. In this drawing, reference numeral 41 designates a calculating section for calculating optimum power consumption and optimum image appearing time in response to a request for a power save mode and another request for releasing the power save mode. Reference numeral 42 designates a duty control signal converting section for controlling a duty ratio of a signal based upon a calculation result obtained by the calculating section 41. The power consumption/image-appearing-time control section 4 is arranged by the above-described calculating section 41 and a duty control signal converting section 42.

Also, reference numeral 61 designates an NPN transistor for controlling a PNP transistor (will be discussed later) by receiving the duty control signal supplied from the duty control signal converting section 42. Reference numeral 62 designates a PNP transistor for switching a power supply voltage applied from the power supplying section 5 in response to the control signal supplied from the NPN transistor 61. Also, reference numerals 63 to 65 designate resistors. The heater-power-supplying control section 6 is constituted by these components 61 to 65. Since other reference numerals shown in FIG. 4 are similar to those of FIG. 1, explanations thereof are omitted.

Next, operations of the image display apparatus will now be described. Similar to the operations of the embodiment 1, the power save mode detecting section 3 judges a use state requested by the signal generating apparatus 1, and then sets a power save mode in correspondence with this judgment result. Based upon the detection information derived from the power save mode detecting section 3, the calculating section 41 sets a duty ratio value to the duty control signal converting section 42 in order to produce a proper heater voltage (in general, for instance, root-mean-square value becomes 6.15 V) when the normal display mode is selected. When the power save mode is selected, the calculating section 41 sets a duty ratio value to the duty control signal converting section 42 in such a manner that the root-mean-square value (effective value) becomes the preset power consumption in the power save mode.

When the power save mode is released, the calculating section 41 calculates a heater application voltage (namely, voltage applied to heater) and application time thereof, by which the preset rising time of the screen can be realized, based upon the below-mentioned relationship, a relative formula conducted from this relationship, or an approximation formula conducted from this relationship, while using the preset power consumption in the power save mode and furthermore the preset rising time in the power save mode. The above-explained relationship is established among previously-mentioned heater supply power in the power save mode, the voltage applied to the heater 71 and the rising time of the screen when the power save mode is released. Then, this calculating section 41 sets both a duty ratio value and heater voltage application time to the duty control signal converting section 42 in such a manner that a root-mean-square value of a voltage applied to the heater 71 can become identical to the calculated voltage.

Based upon the set data received from the calculating section 41, the duty control signal converting section 42 performs a control operation in such a manner that a voltage applied to the heater 71 is changed based upon the duty ratio of the output signal derived from the duty control signal converting section 42. This control manner is performed as follows: For instance, assuming now that a maximum value of an effective voltage required to be applied to the heater 71 is selected to be 8 V and a minimum value of this required effective voltage is selected to be 0 V, the voltage applied to the heater 71 is set to 0 V when the duty ratio is 0% whereas the voltage applied to the heater 71 is set to 8 V when the duty ratio is 100%. In this case, when a target voltage is assumed as an "AV", a duty ratio by which an effective voltage of this target voltage can be obtained may be expressed as (A/8)×100%. For instance, a voltage (6.15 V) applied to the heater 71 in the normal operation mode may be determined by setting the duty ratio as 76.9%.

The above-described duty ratio control operation is realized by employing, for example, a cycle counter and a duty counter for controlling a "Hi"-time period of a signal in synchronism with the cycle counter. Assuming now that the bit of this cycle counter is selected to be 8 bits (namely 255 counts), the count value of the above duty counter becomes 255 counts under 8 V (duty ratio of 100%), and this count value becomes 196 counts under 6.15 V (duty ratio of 76.9%). Alternatively, the above-explained duty control method may be similarly realized by combining a non-multivibrator, a timer, a sawtooth wave generator, and a D/A converter with each other except for the counter.

It should be understood that the maximum voltage of the necessary effective voltage is selected to be 8 V in the above-described concrete example. Since this necessary effective voltage may be determined based upon the maximum value of the heater application voltage when the power save mode is released, and also this maximum heater application voltage differs in accordance with a sort of CRT and minimum available rising time of a screen the maximum value of this necessary effective voltage is determined based on the experiment. Alternatively, both the calculating section 41 and the duty control signal converting section 42 may be controlled in a batch mode by using a microcomputer.

Then, the control signal, the duty ratio of which is determined by the duty control signal converting section 42 by the above-explained manner, is outputted to the heater-power-supplying control section 6, and is received by the base of the NPN transistor 61 functioning as the structural element of this heater-power-supplying control section 6. This NPN transistor 61 is turned ON only during the Hi-period, so that a base current of the PNP transistor 62 may flow. As a result, the PNP transistor 62 is turned ON only during the Hi-period, by which the electric power supplied from the power supplying section 5 may be supplied to the heater 71 of the CRT 7. The effective value (root-mean-square value) of this applied voltage is averaged with respect to the heater 71, since the ON/OFF operations of the transistors are repeated in a high speed. Accordingly, this effective voltage value is expressed by such a value defined by multiplying the voltage outputted from the power supplying section 5 by a ratio of ON-period/(ON-period+ OFF-period).

It should also be noted that in this concrete example, the transistors are employed so as to control supplying of the power supply voltage. Alternatively, even when an FET and a thyristor are employed, a similar effect may be achieved.

Figure 6:
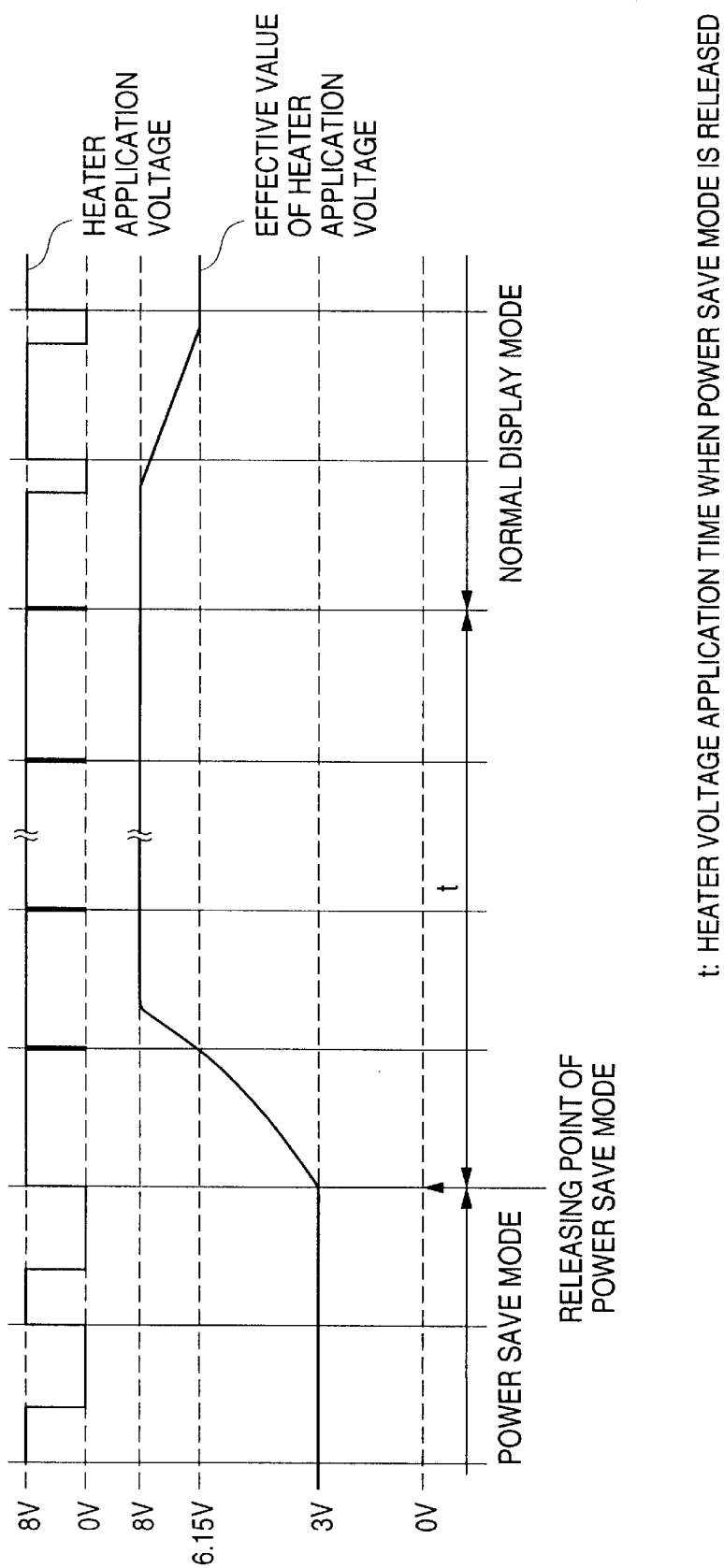
FIG. 6 is a timing chart for indicating a variation in heater application voltages before/after a power save mode is released in the embodiment 2 of the present invention.

FIG. 6 graphically represents a variation in heater input voltage waveforms and effective voltage values thereof before/after the power wave mode is released. When the power save mode is released, the duty ratio is controlled so as to apply such a higher voltage then the voltage during the normal display operation to the heater. As a consequence, the picture appearing time of the screen can be shortened. Since the image display apparatus is controlled in the above-explained manner, a high precision digital image processing operation can be carried out.

Embodiment 3

Next, a description will now be made of an embodiment 3 of the present invention. This embodiment 3 discloses that a switched voltage is applied to the heater 71. Specifically speaking, in accordance with an image display apparatus of this embodiment 3, electric power is controlled by controlling OFF-time of the switched voltage. This operation will now be described with reference to a circuit arrangement shown in FIG. 7.

Figure 7:
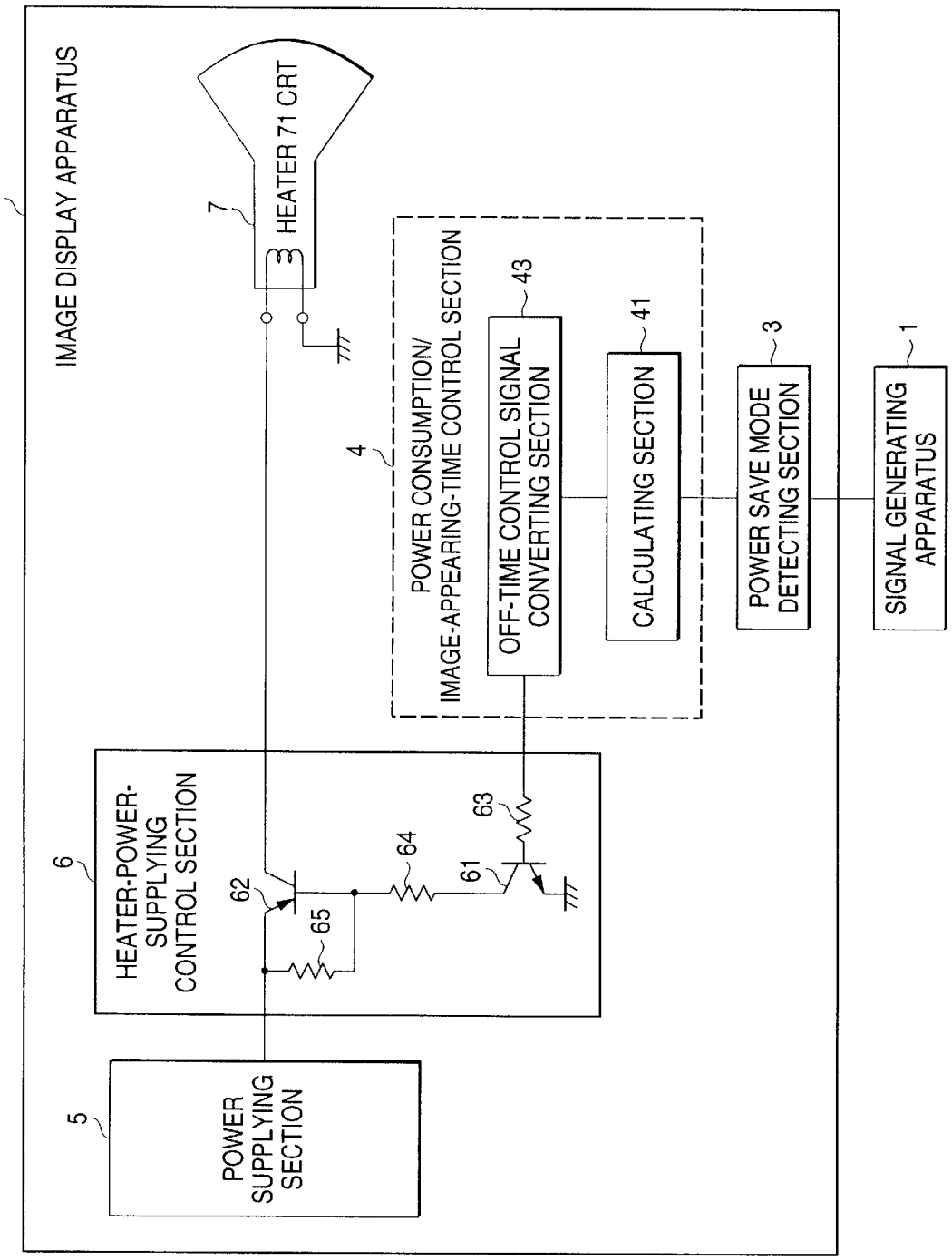
FIG. 7 is a detailed block diagram of an image display apparatus for showing an embodiment 3 of the present invention.

FIG. 7 is a schematic block diagram for showing an arrangement of the image display apparatus 2 of this embodiment 3 in which a heater voltage is controlled by controlling OFF-time of a switched voltage.

In this drawing, reference numeral 4 designates a power consumption/image-appearing-time control section. This power consumption/image-appearing-time control section 4 calculates a heater voltage in response to each of modes based upon detection information derived from the above-described power save mode detecting section 3, and then, controls this heater voltage by controlling OFF-time of a switched voltage. This power consumption/image-appearing time control section 4 is arranged by the above-explained calculating section 41 and the below-mentioned OFF-time control signal converting section 43. Also, reference numeral 43 designates an OFF-time control signal converting section for controlling OFF time of a signal based upon the calculation result of the calculating section 41. Since other circuit arrangements of this image display apparatus are similar to those of FIG. 4, explanations thereof are omitted.

Next, operations of this image display apparatus 2 will now be explained. Similar to the calculations performed in the calculating section 41 of the embodiment 2, the following calculation is carried out by the calculating section 41 based upon the detection information derived from the power save mode detecting section 3. That is, an optimum heater application voltage and also optimum voltage application time are calculated in correspondence with the normal display mode, the power save mode, and the power-save release mode. Then, the data set by this calculation result is supplied to the OFF-time control signal converting section 43.

In the OFF-time control signal converting section 43, the electric power applied to the heater 71 is controlled by the OFF time based upon the set data received from the calculating section 41. Precisely speaking, while the ON-time period of the control signal outputted from the OFF-time control signal converting section 43 is fixed, the effective value (root-mean-square value) of the voltage applied to the heater 71 is controlled by changing the OFF-time period. As a result, when the OFF-time period is reduced to zero, the effective value of the heater application voltage becomes maximum. While the OFF-time period is prolonged, the effective value of the heater application voltage is lowered.

In other words, when the OFF-time period is made equal to the ON-time period, the effective value of the heater application voltage becomes a half of the maximum value. When the OFF-time period becomes two times longer than the ON-time period, the effective value of the heater application voltage becomes a ⅓ maximum value. This relationship is expressed by the following formula:

Effective value of heater application voltage=[1/(OFF-time period/ON-time period)+1]×maximum value.

The control signal controlled by this OFF time is inputted to the base of the NPN transistor 61 which is the structural element of the heater power supply control section 6. Since the subsequent operation of this image display apparatus is carried out in a similar manner to that of the embodiment 2, descriptions thereof are omitted.

Figure 8:
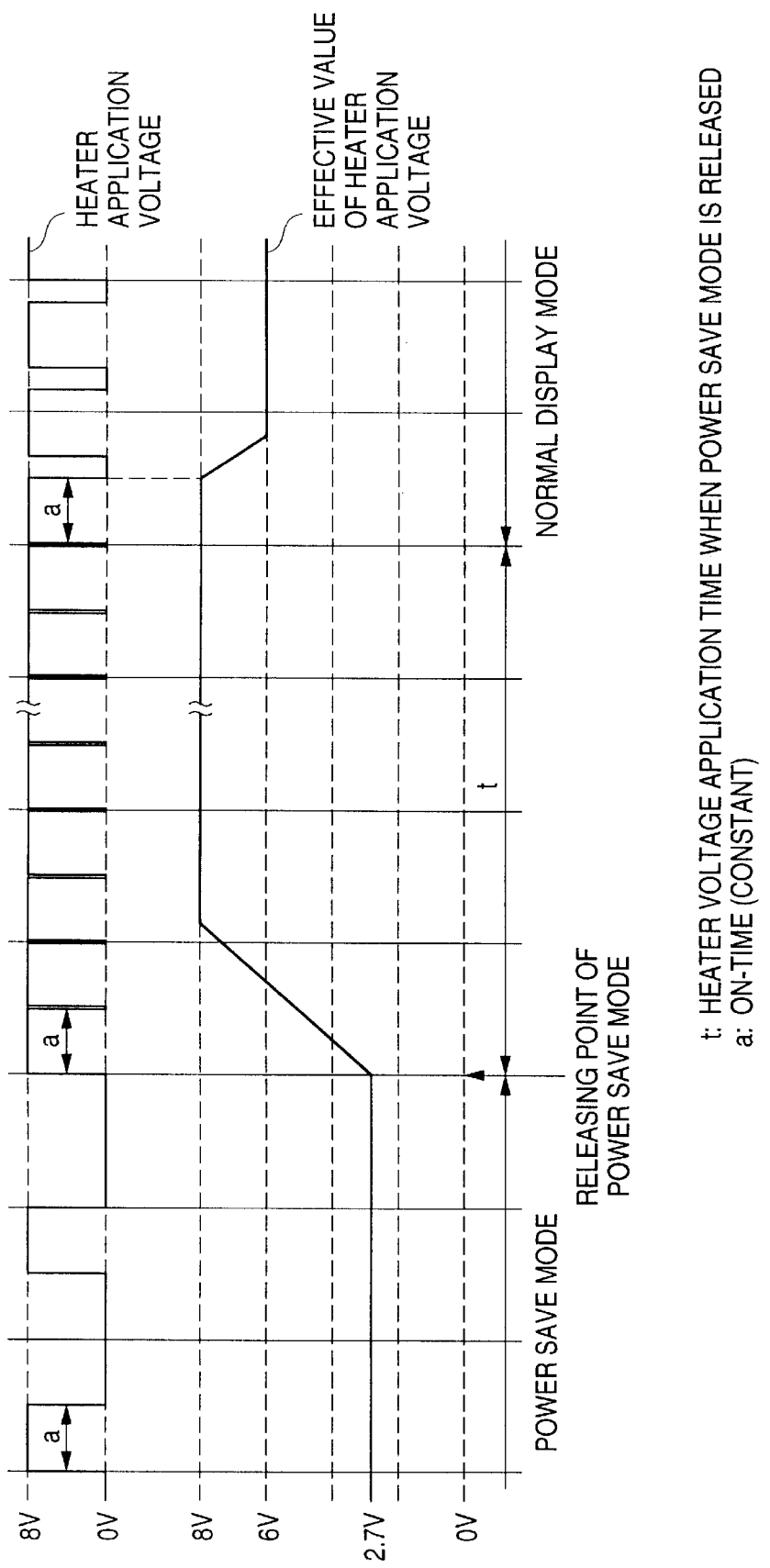
FIG. 8 is a timing chart for indicating a variation in heater application voltages before/after a power save mode is released in the embodiment 3 of the present invention.

FIG. 8 graphically shows variations in waveforms of heater input voltages and effective values thereof before/after the power save mode is released. The power consumption may be reduced by prolonging the OFF time so as to lower the effective voltage of the heater application voltage to the heater 71 in the power save mode. When the power save mode is released, the OFF time is shortened only by a time period "t" so as to apply such a higher effective voltage than the heater application effective voltage in the normal display mode. As a result, the heating speed of the heater 71 is increased to shorten the rising time of the screen, so that the set rising time of the screen can be realized.

Embodiment 4

Next, a description will now be made of an embodiment 4 of the present invention. This embodiment 4 discloses that a switched voltage is applied to the heater 71. Specifically speaking, in accordance with an image display apparatus of this embodiment 4, electric power is controlled by controlling a pulse number of the switched voltage within a constant time period. This operation will now be described with reference to a circuit arrangement shown in FIG. 9.

Figure 9:
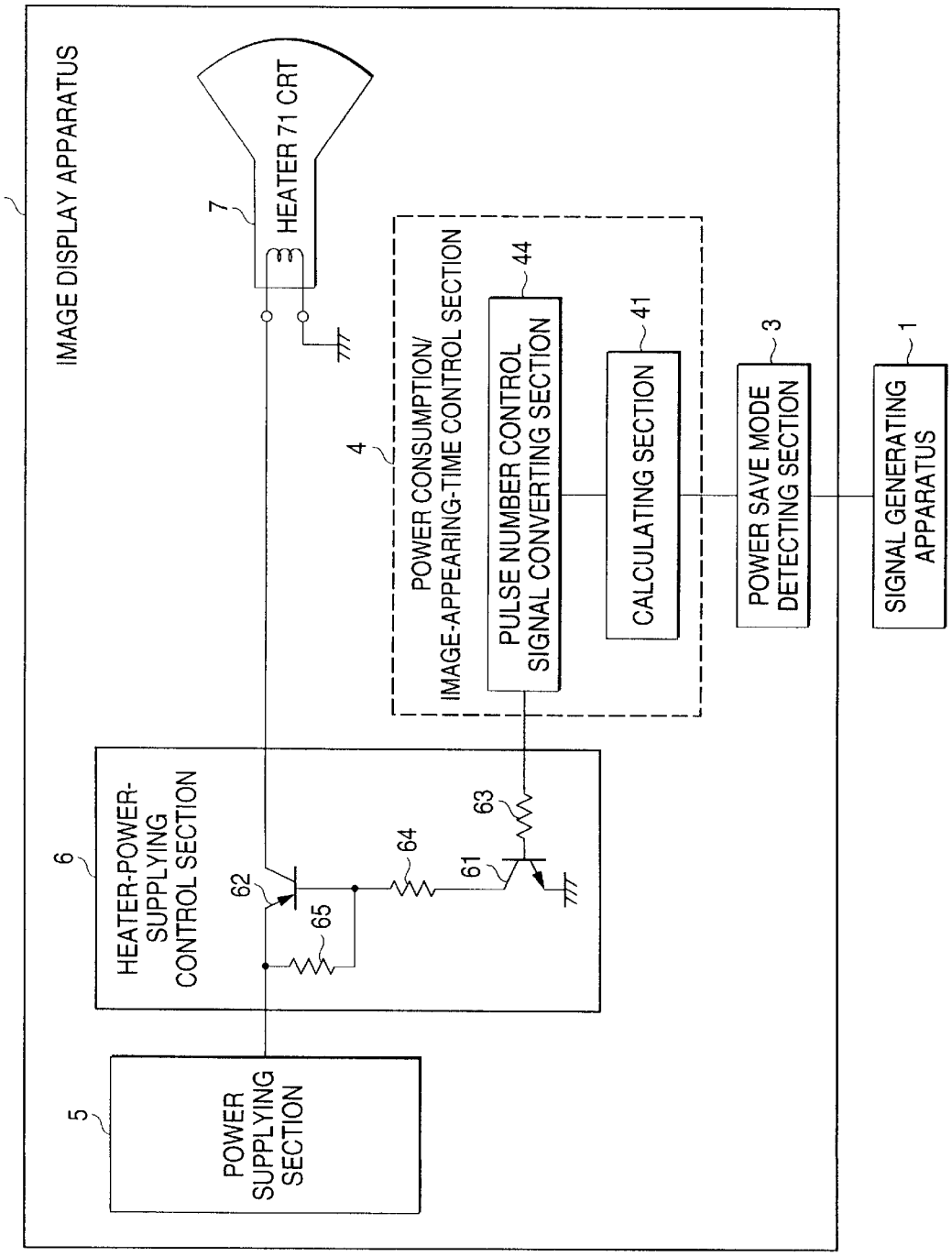
FIG. 9 is a detailed block diagram of an image display apparatus for showing an embodiment 4 of the present invention.

FIG. 9 is a schematic block diagram for showing such a case that an effective value of a heater application voltage is controlled by controlling a pulse number of a switch voltage within a constant time period. In this drawing, reference numeral 4 designates a power consumption/image-appearing-time control section. This power consumption/image-appearing-time control section 4 calculates a heater voltage in response to each of modes based upon detection information derived from the above-described power save mode detecting section 3, and then, controls this heater voltage by controlling a pulse number of a switched voltage within a constant time period. The power consumption/image-appearing-time control section 4 is constituted by the above-explained calculating section 41 and the below-mentioned pulse number control signal converting section 44. Reference numeral 44 designates a pulse number control signal converting section for controlling a total pulse number within a control time period based upon a calculation result of the calculating section 41. Since other circuit arrangements of this image display apparatus are similar to those of FIG. 4, explanations thereof are omitted.

Next, operations of this image display apparatus 4 will now be explained. Similar to the calculations performed in the calculating section 41 of the embodiment 2, the following calculation is carried out by the calculating section 41 based upon the detection information derived from the power save mode detecting section 3. That is, an optimum heater application voltage and also optimum voltage application time are calculated in correspondence with the normal display mode, the power save mode, and the power-save release mode. Then, the pulse number data set by this calculation result is supplied to the pulse number control signal converting section 44.

Figure 10:
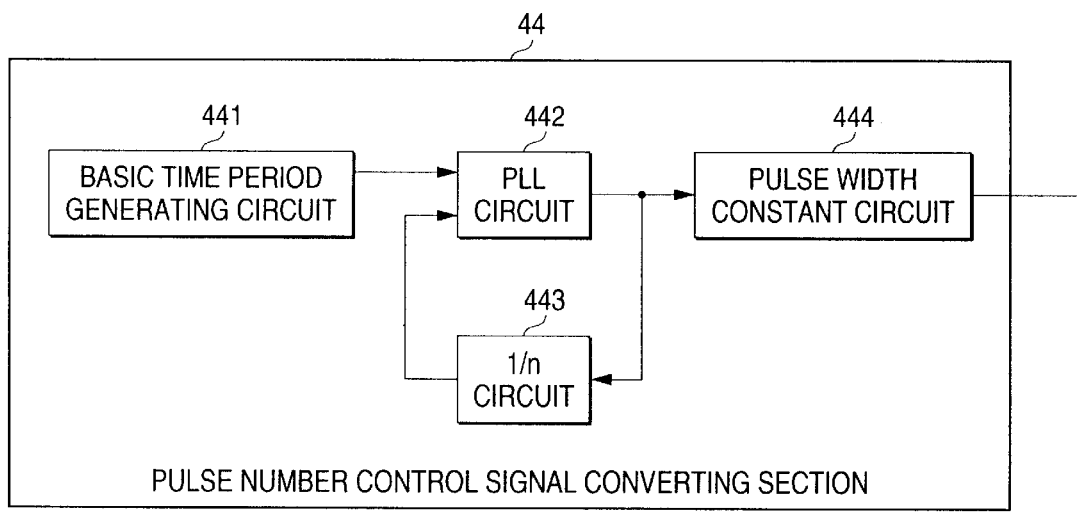
FIG. 10 is a detailed internal arrangement diagram of a pulse number control signal converting section employed in the embodiment 4 of the present invention.

The pulse number control signal converting section 44 controls the electric power applied to the heater 71 based upon the pulse number data received from the calculating section 41 in response to a total pulse number of the control signal within a predetermined time period, which is outputted from the pulse number control signal converting section 44. In this case, for example, as shown in FIG. 10, a pulse number within a constant time period, outputted from a basic time period generating circuit 441 is multiplied by "n" in a 1/n circuit 443 by employing a PLL circuit 442. Furthermore, a pulse width constant circuit 441 is provided. This pulse width constant circuit 444 makes the pulse width of the respective pulses constant even when a total pulse number is changed. At this time, resolution of the control is determined by "n". Also, the more a total number of "n" is increased, the longer the ON-time period of the signal is prolonged, so that the voltage is increased.

Specifically speaking, assuming now that a maximum value of the pulse numbers within a constant time period is equal to "M" and an effective value of a heater application value at this time is equal to a maximum value "L" of the heater application voltage, a relationship between the pulse number N calculated by the calculating section 41 and the effective value of the heater application voltage is expressed by the following formula:

Effective value of heater application voltage=$(N/M) \times L$.

As a result, such a control signal having a constant pulse width, the pulse number of which is controlled, is supplied to the base of the NPN transistor 61 which is the structural element of the heater power supply control section 6. Since the subsequent operation of this image display apparatus is carried out in a similar manner to that of the embodiment 2, descriptions thereof are omitted.

Figure 11:
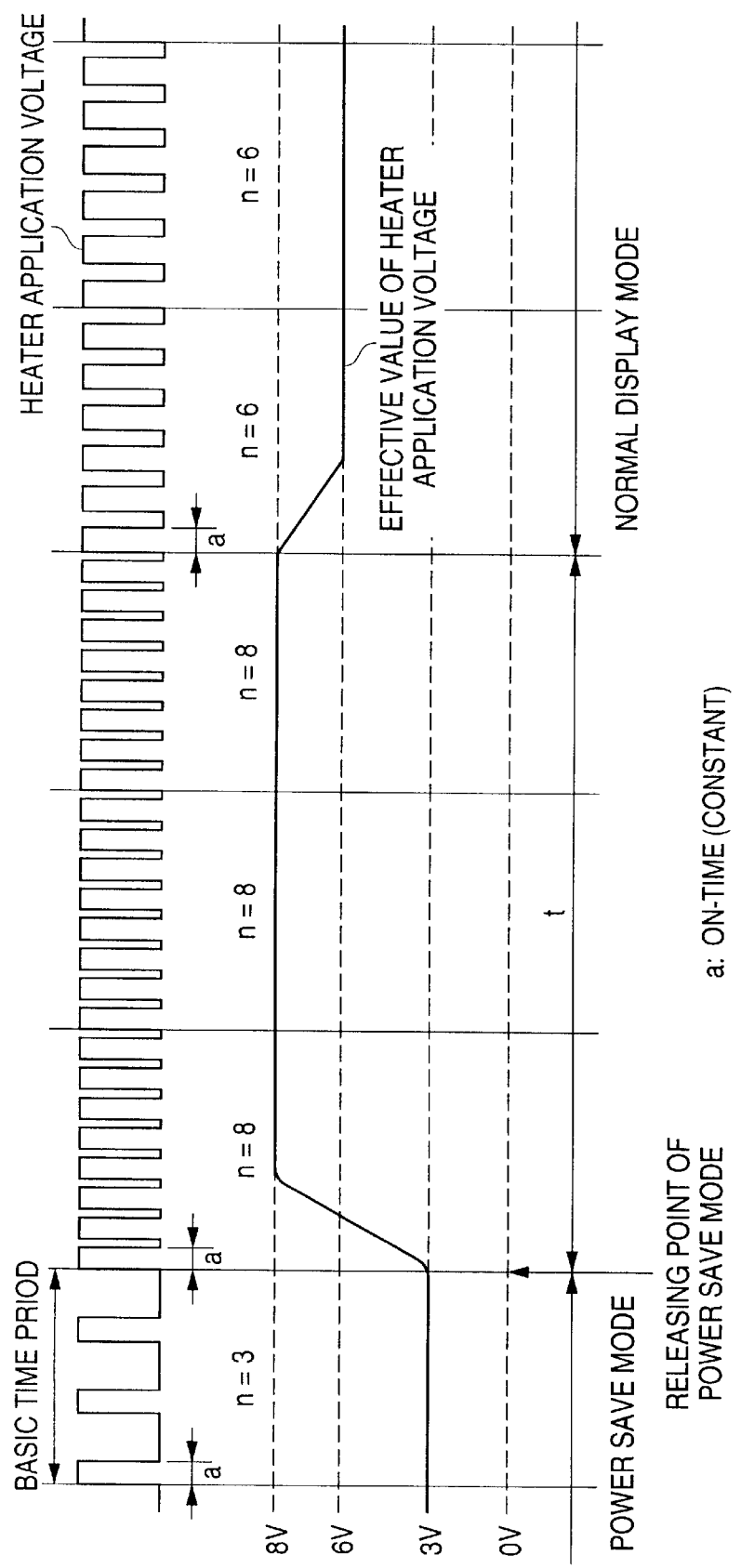
FIG. 11 is a timing chart for indicating a variation in heater application voltages before/after a power save mode is released in the embodiment 4 of the present invention.

FIG. 11 graphically shows variations in waveforms of heater input voltages and effective values thereof before/ after the power save mode is released. The power consumption may be reduced by lowering the effective voltage of the heater application voltage to the heater 71, while decreasing the pulse number in the power save mode. When the power save mode is released, the total pulse number is reduced by a first time period "t" so as to apply such a higher effective voltage than the heater application effective voltage in the normal display mode. As a result, the heating speed of the heater 71 is increased to shorten the rising time of the screen, so that the set rising time of the screen can be realized.

Embodiment 5

Figure 12:
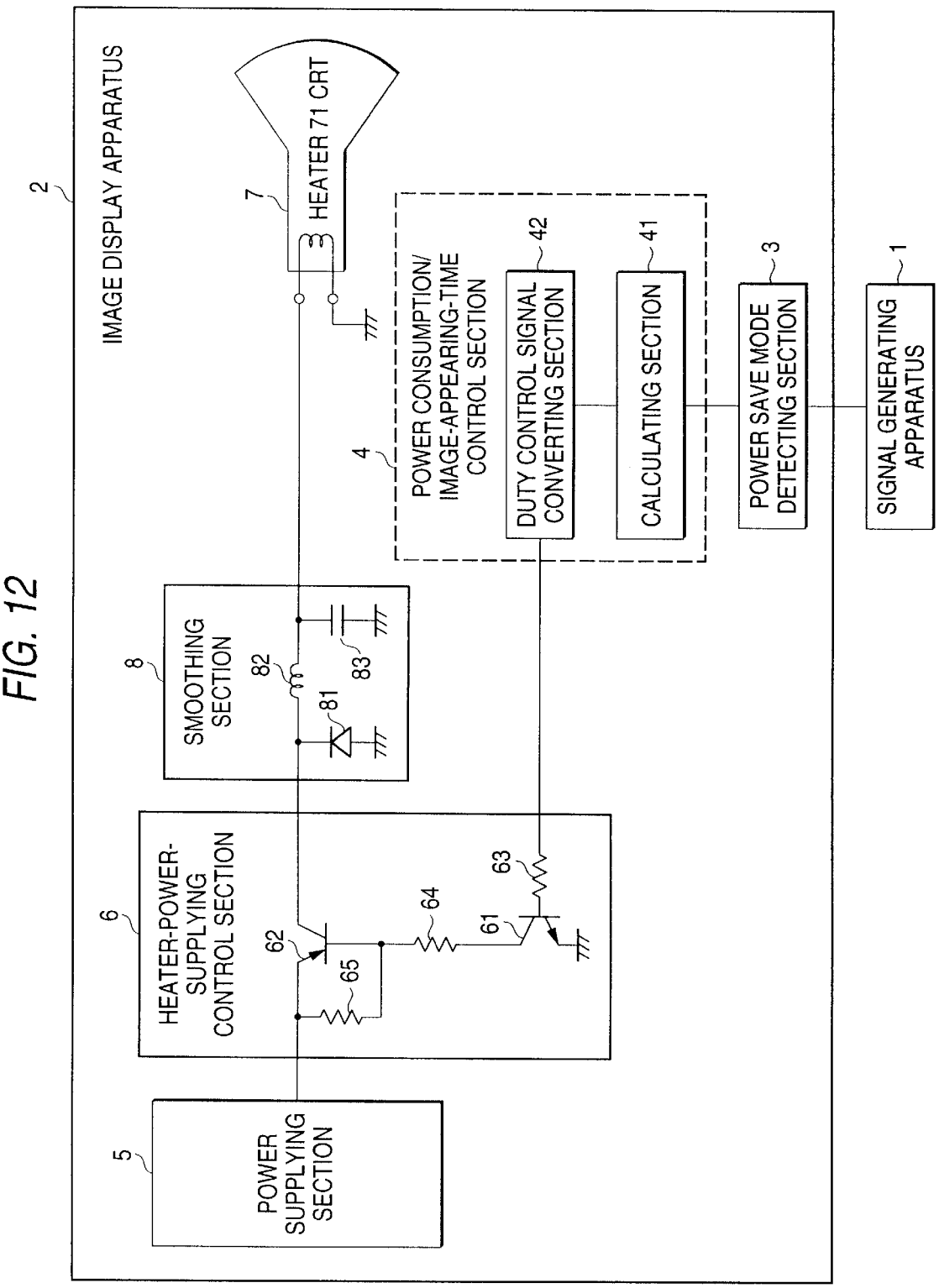
FIG. 12 is a detailed block diagram of an image display apparatus for showing an embodiment 5 of the present invention.

Next, a description will now be made of an embodiment 5 of the present invention. The above-described embodiment 2 discloses that the switched voltage whose duty ratio is controlled is applied to the heater 71. In this image display apparatus of the embodiment 2, as shown in FIG. 12, a smoothing section 8 is provided between the output of the heater-power-supplying control section 6 and the heater input of the CRT 7. This smoothing section 8 may convert the switched AC voltage into a voltage which is nearly equal to a DC voltage. For example, this smoothing section 8 is arranged by a diode 81, a coil 82, a capacitor 83, and the like as represented in FIG. 12.

As a result, a pulsatory high voltage is no longer applied to the heater 71, and thus, the smoothed low heater voltage may be applied to the heater 71 of the CRT 7. Accordingly, there is such a merit that stress given to the heater 71 can be reduced. Also, since this heater application voltage is substantially equal to the DC voltage, there is another merit that the occurrence of noise can be suppressed, as compared with the applications of the pulsatory heater voltages as explained in the previous embodiments.

Embodiment 6

Next, a description will now be made of an embodiment 6 of the present invention. The above-explained embodiment 6 discloses that the switched heater voltage is converted into the DC voltage to be applied to the heater 71 by employing the smoothing section 8. In this image forming apparatus of the embodiment 6, the heater electric power is controlled by directly controlling an analog level of a control signal in response to set information supplied to the calculating section 41 with reference to an internal arrangement shown in FIG. 13.

Figure 13:
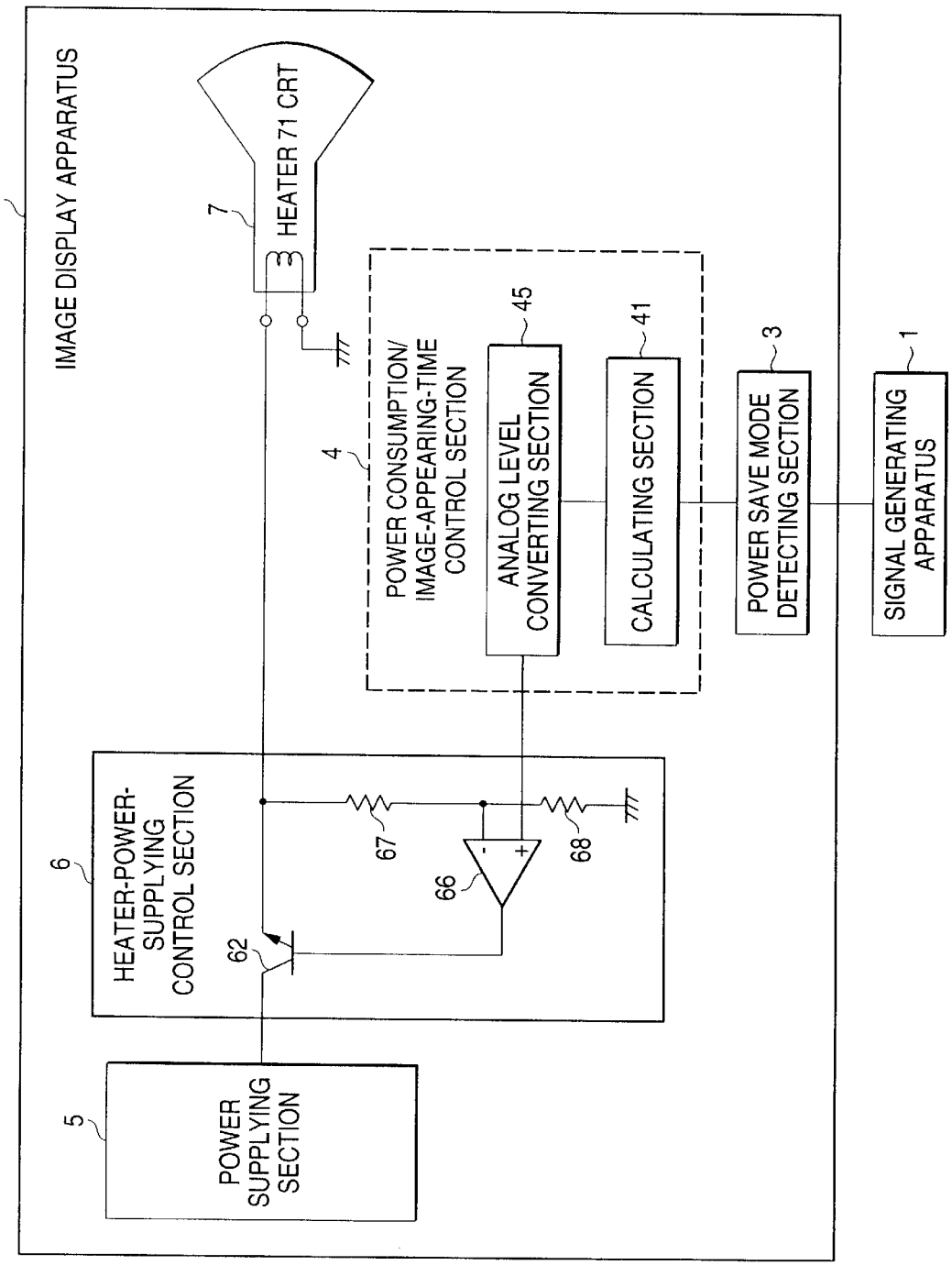
FIG. 13 is a detailed block diagram of an image display apparatus for representing an embodiment 6 of the present invention.

FIG. 13 is a schematic block diagram for indicating the internal arrangement of this image display apparatus according to the embodiment 6 operated in such a manner that the heater electric power is controlled by controlling the analog level of the control signal. In this drawing, reference numeral 4 designates a power consumption/image-appearing-time control section operable by that a heater voltage corresponding to each of these modes is calculated based upon the detection information derived from the power save mode detecting section 3, and then this calculated heater voltage is controlled by controlling an analog level of a control signal. This power consumption/image-appearing-time control section is arranged by the above-explained calculating section 41 and an analog level converting section 45 (will be discussed later). Reference numeral 45 designates an analog level converting section for controlling an analog level of a control signal based upon the calculation result of the calculating section 41.

Also, reference numeral 66 designates an operational amplifier having a "+"-sided (non-inverting) input terminal and a "−"-sided (inverting) input terminal. The "+"- sided input terminal receives a control signal derived from the analog level converting section 45. The "−"-sided input terminal receives such a voltage which is produced by dividing a voltage applied to the heater 71 by using a resistor 67 and another register 68. Reference numeral 62 designates an NPN transistor which receives the output signal from the operational amplifier 66 and controls the voltage applied from the power supplying section 5 to output the controlled voltage to the heater 71. This constitutes the heater-power-supplying control section 6. Since the subsequent operation of this image display apparatus is carried out in a similar manner to that shown in FIG. 4, descriptions thereof are omitted.

Next, operations of this image display apparatus 2 will now be explained. Similar to the calculations performed in the calculating section 41 of the embodiment 2, the following calculation is carried out by the calculating section 41 based upon the detection information derived from the power save mode detecting section 3. That is, an optimum heater application voltage and also optimum voltage application time are calculated in correspondence with the normal display mode, the power save mode, and the power-save release mode. Then, the value set by this calculation result is supplied to the analog level converting section 45.

Based upon the set value information entered from the calculating section 41, the analog level converting section 45 controls the electric power to be supplied to the heater 71 by way of the analog level of the control signal. In this case, for example, the digital data is converted into the corresponding analog value by employing a D/A converter in the analog level converting section 45, and then this analog value is inputted to the "+"-sided input terminal of the operational amplifier 66 of the heater-power-supplying control section 6.

The operational amplifier 66 compares a control voltage applied to the "+"-sided input terminal thereof with the subdivided voltage of the heater application voltage applied to the "−"-sided input terminal thereof. In the case that the control voltage of the "+"-sided input terminal is higher than the subdivided voltage of the "−"-sided input terminal, the output voltage of the operational amplifier 66 is increased by a difference voltage between both the control voltage and the subdivided voltage so as to increase the base voltage of the NPN transistor 62. As a result, the heater application voltage is increased by the above-explained difference voltage, so that the electric power supplied from the power supplying section 5 to the heater 71 is increased. When the heater voltage is increased, a voltage appearing at the "−"-sided input terminal of the operational amplifier 66, to which the heater voltage subdivided by the resistors 67 and 68 is applied, is increased and thereafter is brought into a stable state when this increased voltage becomes equal to the control voltage applied to the "+"-sided input terminal thereof.

As previously explained, the heater application voltage may be determined based upon the resistance ratio of the resistor 67 to the resistor 68 and also the voltage of the control signal entered into the "+"-sided input terminal of the operational amplifier 66. Assuming now that the resistance value of the resistor 67 is "R67" and the resistance value of the resistor 68 is "R68", the heater application voltage is expressed by the following formula:

Heater application voltage=[($R67$+$R68$)/$R68$]×(input voltage of "+"-sided input terminal).

For instance, assuming now that the output of the analog level converting section 45 is controlled within a range between 0 V and 5 V, in the case that the heater application voltage is controlled within a range between 0 V and 8 V, the resistance values may be selected to satisfy a relationship of R67=0.6×R68.

Figure 14:
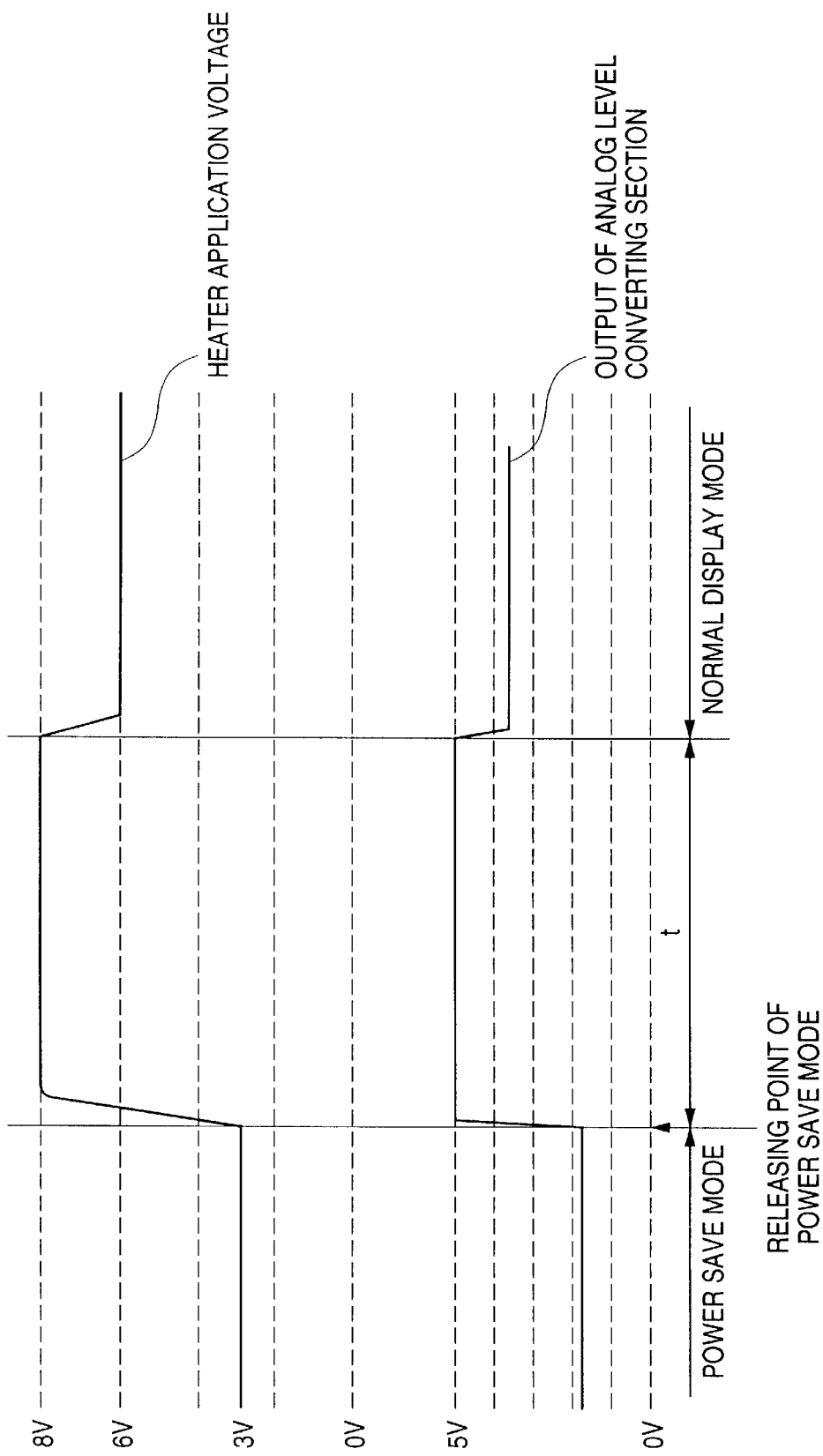
FIG. 14 is a timing chart for indicating a variation in heater application voltages before/after a power save mode is released in the embodiment 6 of the present invention.

FIG. 14 graphically shows variations in waveforms of heater input voltages and effective values thereof before/after the power save mode is released. The power consumption may be reduced by reducing the analog level of the control signal so as to lower the effective voltage of the heater application voltage to the heater 71 in the power save mode. When the power save mode is released, the analog level of the control signal is increased only by a first time period "t" so as to apply such a higher effective voltage than the heater application effective voltage in the normal display mode. As a result, the heating speed of the heater 71 is increased to shorten the rising time of the screen, so that the set rising time of the screen can be realized.

As previously described, in accordance with this embodiment 6, since the analog level of the control signal is controlled, the voltage applied to the heater is also the substantially DC voltage. Thus, there is an effect that no switching noise is produced from the circuit. Also, there is another merit that since the maximum voltage of the heater application voltage may be made lower than the switched heater voltage in the normal display mode and the power save mode, the stress given to the heater 71 can be reduced.

Embodiment 7

Next, a description will now be made of an embodiment 7 of the present invention. In accordance with an image display apparatus of this embodiment 7, electric power is controlled as follows: That is, in addition to the previously explained control circuit, a heater voltage is detected to be fed back to the power consumption/image-appearing-time control section 4, so that an error between a detected value and a target value may be corrected.

Figure 15:
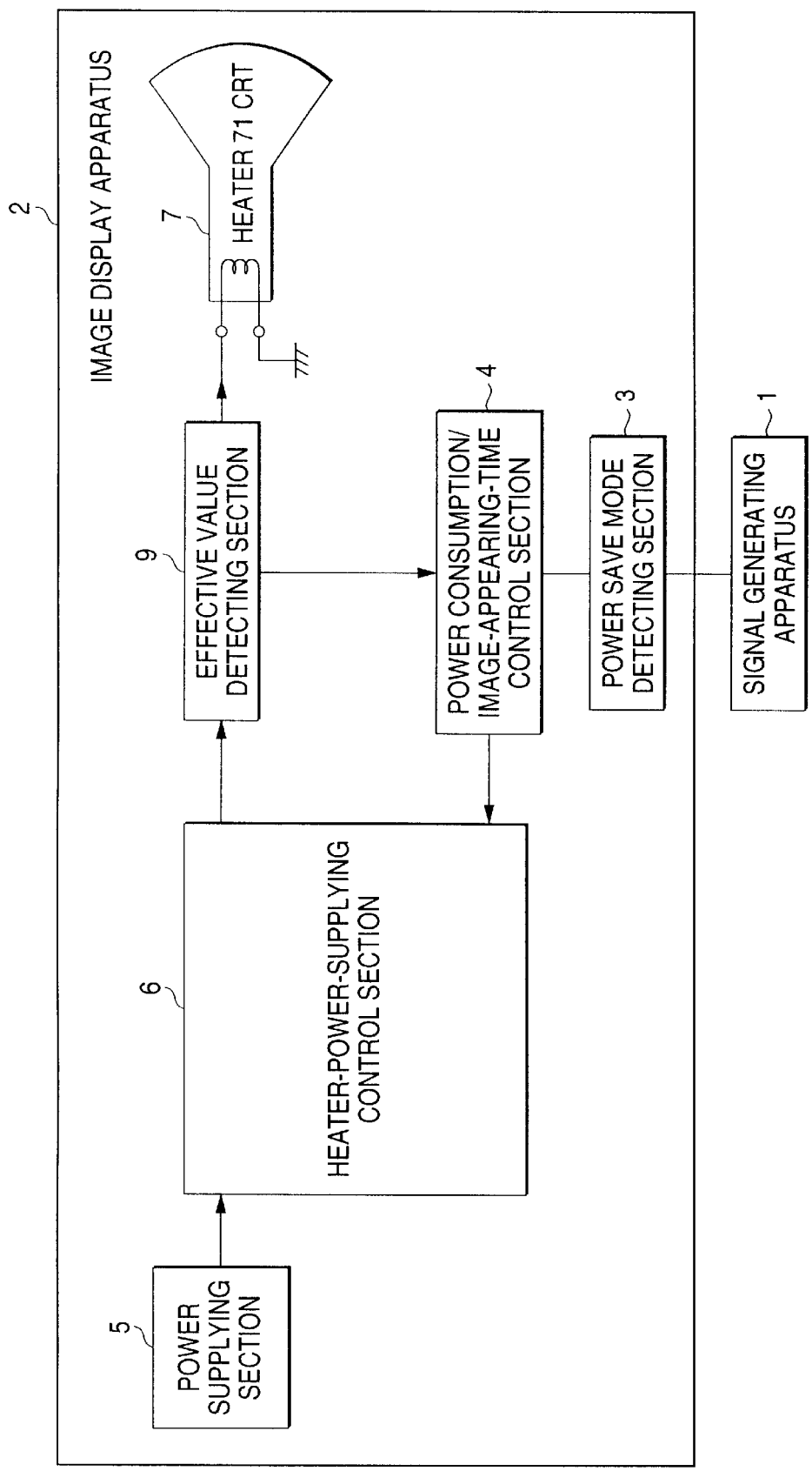
FIG. 15 is a general block diagram of an image display apparatus for showing an embodiment 7 of the present invention.

FIG. 15 is a schematic block diagram for indicating the image display apparatus, according to this embodiment 7, operated in such a case that a feedback control is carried out. A different arrangement between this embodiment 7 and the previously explained embodiments is given as follows: That is, an effective value detecting section is provided between the heater-power-supplying control section 6 and the heater 71. This effective value detecting section 9 detects an effective value (root-mean-square value) of a heater application voltage, and then outputs this detection value (namely, effective value) to the power consumption/image-appearing-time control section 4, so that a difference between the present value and the target value can be detected.

Next, operations of this image display apparatus 2 will now be explained. Similar to the previous embodiment, the following calculation is carried out by the power consumption/image-appearing-time control section 4 based upon the detection information derived from the power save mode detecting section 3. That is a heater application voltage and also heater voltage application time, corresponding to target power and target rising time, are calculated in correspondence with the normal display mode, the power save mode, and the power-save release mode. Then, a control signal corresponding to this calculation result is supplied to the heater-power-supplying control section 6. The heater-power-supplying control section 6 controls the voltage applied from the power supply section 5 in response to the control signal entered from the heater-power-supplying control section 6, so that an effective value voltage for constituting a target voltage is outputted to the heater 71.

The effective value detecting section 9 detects the effective value of the voltage applied to the heater 71, and then supplies either this detection value or a detection signal to the power consumption/image-appearing-time control section 4. In this power consumption/image-appearing-time control section 4, an error contained in either the detection value or the detection signal with respect to the target value is measured, and then the above-described control signal is corrected in such a manner that either the detection value or the detection signal can be approximated to the target value. Since such a control operation is carried out in this manner, the electric power having higher precision with respect to the target value can be applied to the heater 71, and furthermore, the stable electric power can be supplied with respect to the aging change and the environmental change. As a concrete circuit arrangement of the effective value detecting section 9, in general, such circuits may be conceived which employ an LC filter, a multiplier, or a microcomputer.

Embodiment 8

Next, a description will now be made of an image display apparatus according to an embodiment 8 of the present invention. In the above-explained embodiments, all of the operations are carried out by using a single circuit, while the wide dynamic range is set. In these operations, the high voltage is applied to the heater 71 when the power save mode is released, and the heater voltages are applied in the normal display mode and the power save mode. In this embodiment 8, a control operation of power consumption by the heater 71 and also another control operation of rising time of the screen are carried out by separately provided circuits. An internal arrangement of this image display apparatus of this embodiment 8 will now be explained with reference to FIG. 16.

Figure 16:
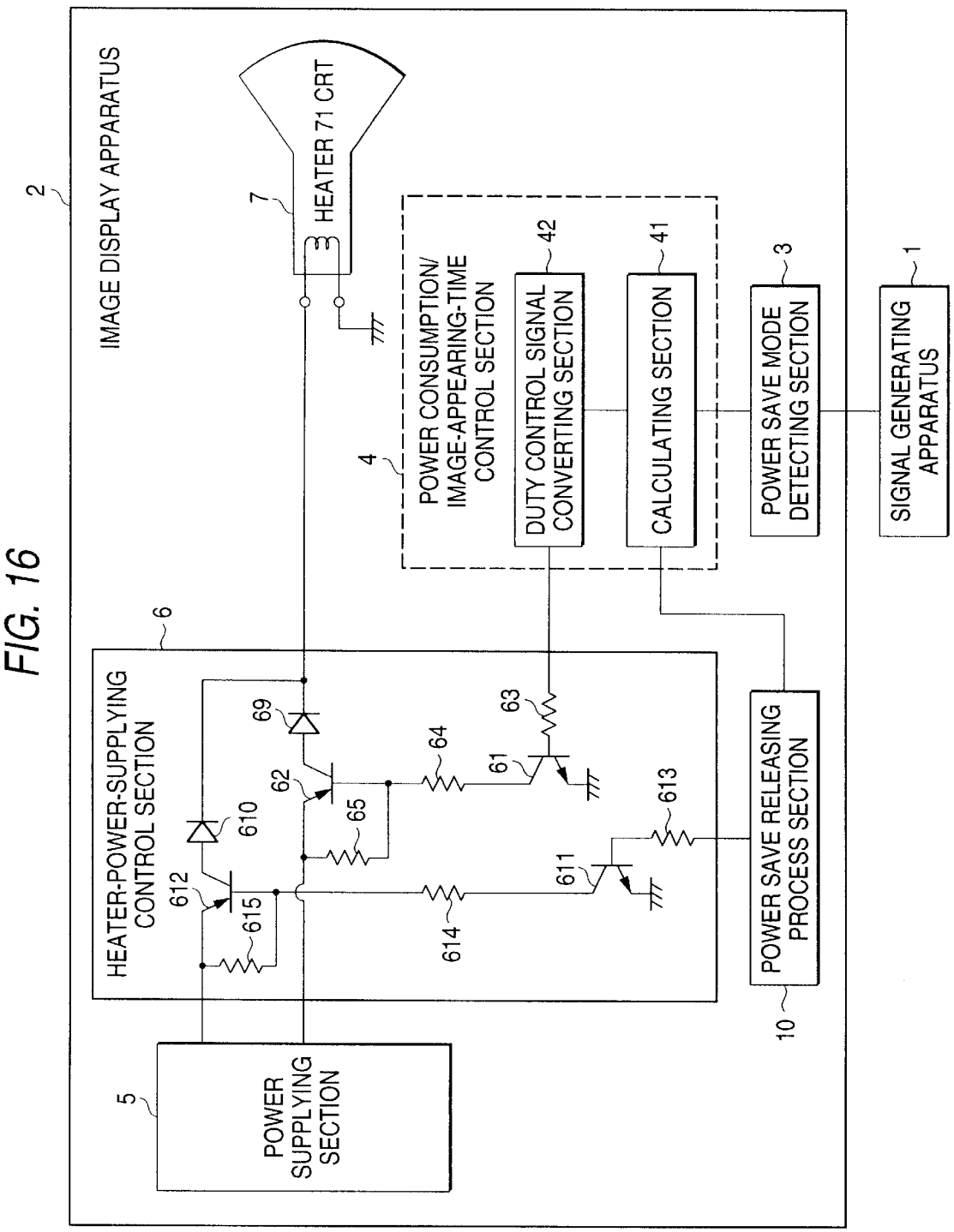
FIG. 16 is a detailed block diagram of an image display apparatus for representing an embodiment 8 of the present invention.

FIG. 16 is a schematic block diagram for representing an internal arrangement of this image display apparatus 2 operated in such a case that the power consumption of the heater 71 and the rising time of the screen are controlled by independently provided circuits. In this drawing, reference numeral 10 designates a power save releasing process section. Upon receipt of data about high voltage application time which is calculated by the calculating section 41 when the power save mode is released, this power save releasing process section 10 outputs a control signal for a time period defined by this high voltage application time so as to control a high voltage application to the heater 71.

Also, reference numeral 611 designates an NPN transistor which receives a control signal from the power save releasing process section 10 so as to control a PNP transistor (will be discussed later). Reference numeral 612 designates a PNP transistor for ON/OFF-controlling a supply of a second power supply voltage which is applied from the power supply section 5 to the CRT 71 under control of the NPN transistor 611. Reference numerals 613 to 615 designate resistors. The collector output of the PNP transistor 612 and the collector output of the PNP transistor 62 are OR-connected to each other via a diode 610 and another diode 69.

Furthermore, the heater-power-supplying control section is arranged by combining a circuit arrangement of the above-explained PNP transistor 612 and NPN transistor 611 with another circuit arrangement of the above-explained PNP transistor 62 and NPN transistor 61. Other circuit elements of this image display apparatus 2 are similar to those of the above-explained embodiments, descriptions thereof are omitted.

Next, operations of this image display apparatus 2 will now be explained. Similar to the calculations performed in the calculating section 41 of the embodiment 2, the following calculation is carried out by the calculating section 41 based upon the detection information derived from the power save mode detecting section 3. That is, an optimum heater application voltage and also optimum voltage application time are calculated in correspondence with the normal display mode, the power save mode, and the power-save release mode. Then, based upon the calculation result, set values related to heater voltage control operations in the power save mode and in the normal display mode are supplied to the duty control signal converting section 42, and also a set value related to high voltage application time when the power save mode is released is supplied to the power save releasing process section 10.

In response to the set value information supplied from the calculating section 41, the duty control signal converting section 42 outputs a control signal having an optimum duty ratio, by which a optical heater application voltage may be applied to the heater 71 in the normal display mode, and the below-mentioned voltage is applied to the heater 71. That is, when the power save mode is selected, this heater application voltage may produce preset power consumption defined in the power save mode.

This control signal is supplied to the base of the NPN transistor 61 of the heater-power-supplying control section 6 so as to control the PNP transistor 62. As previously explained, the PNP transistor 62 applies a first voltage via the diode 69 to the heater 71 only for a time period during which the control signal becomes "Hi". This first voltage is derived from the power supply section 5, and is used to supply the electric power to the heater 71 in the normal display mode and the power save mode. When these two modes are set, since the PNP transistor 612 is brought into the OFF state, the diode 610 is reverse-biased, so that this diode 610 is turned OFF. In other words, the power consumption of the heater 71 is controlled by controlling the duty ratio of the switched heater voltage.

It should be noted that the first voltage may be selected to such a maximum voltage by which the optimum voltage (for instance, 6.15 V) of the heater 71 in the normal display mode. In connection with this aspect, the dynamic range of the heater power supplying control section 6 may be made smaller than that of the embodiment 2. In this case, a similar control operation to that of the embodiment 2 may be carried out in such a manner that the optimum voltage (for example, 6.15 V) of the heater is produced when the duty ratio is selected to be 100% and also the heater voltage of 0 V is produced when the duty ratio is selected to 0%.

On the other hand, since the high voltage is applied to the heater 71 only during a time period set by the set value information received from the calculating section 4 after the power save mode is released in the power save releasing process section 10, such a control signal which becomes a "Hi" level during this time period is outputted. This control signal is inputted to the base of the NPN transistor 611 employed in the heater power supplying control section 6 so as to control the PNP transistor 612. As previously explained, the PNP transistor 612 applies the second voltage higher than at least the first voltage via the diode 610 to the heater 71 only for such a time period during which the control signal becomes a "Hi" level in order to shorten the rising time of the screen. During this Hi-time period, since the second voltage becomes higher than the first voltage, the diode 69 is brought into the reverse bias state, namely OFF state.

Normally, in order to simplify the control operation of the rising time of the screen in this embodiment, while the voltage value of the applied high voltage is kept constant, the application time of this high voltage is controlled. Apparently, both the high voltage and the application time may be alternatively controlled by controlling the duty ratio of the signal in a similar manner to the duty control signal converting section 42. Also, in this concrete example, the duty ratio control of the switched heater application voltage has been described, but the present invention is not limited thereto. Other control operations may be similarly applied to the embodiments other than this concrete example.

Figure 17:
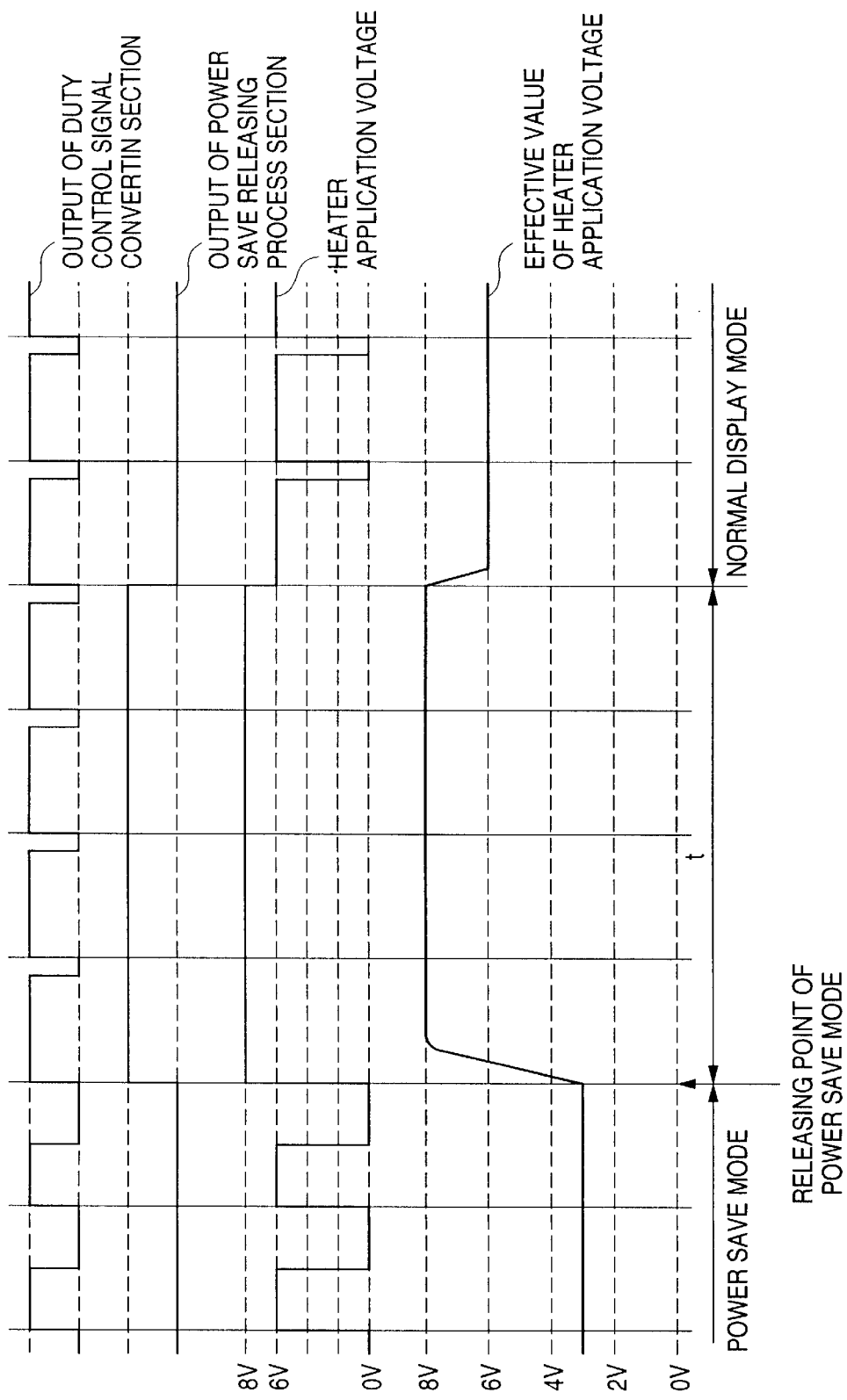
FIG. 17 is a timing chart for indicating a variation in heater application voltages before/after a power save mode is released in the embodiment 8 of the present invention.
Figure 19:
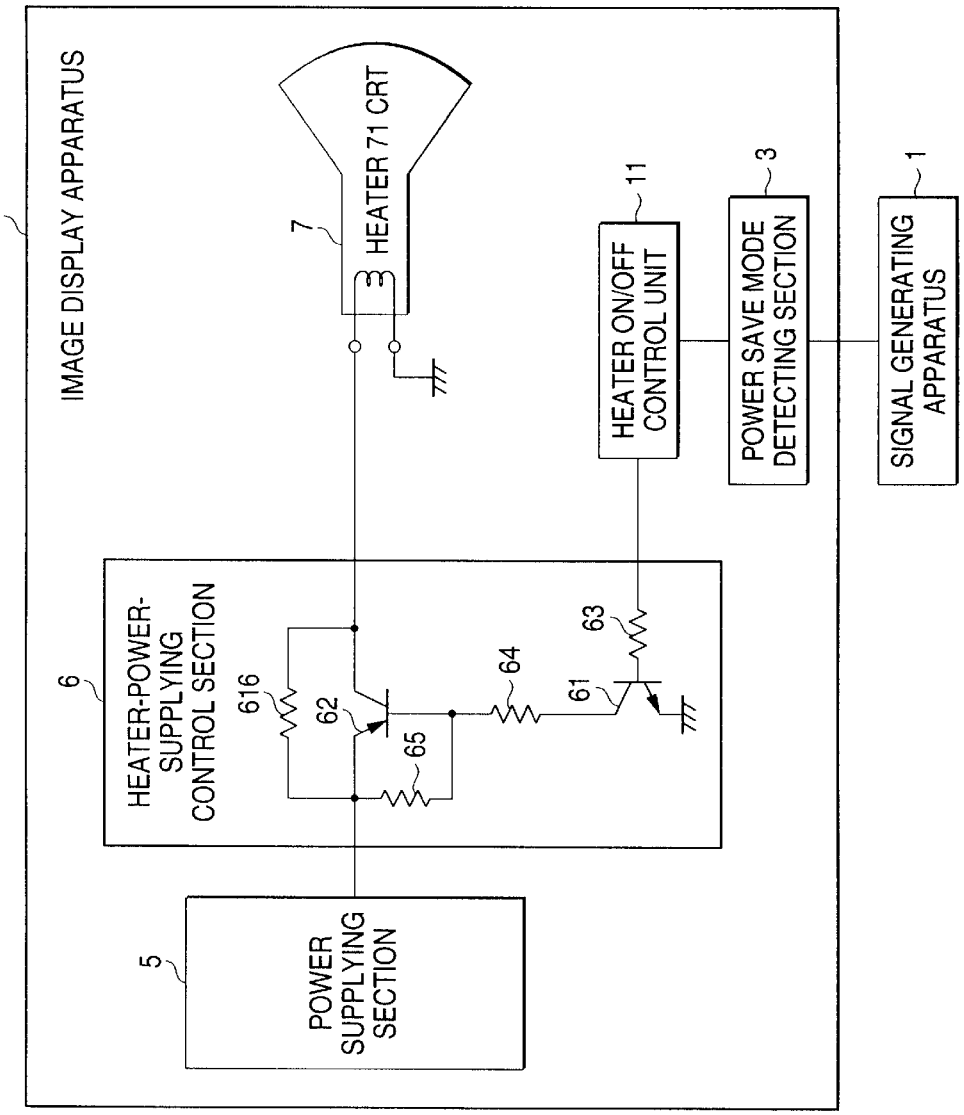
FIG. 19 is a block diagram for showing the conventional image display apparatus.
Figure 20:
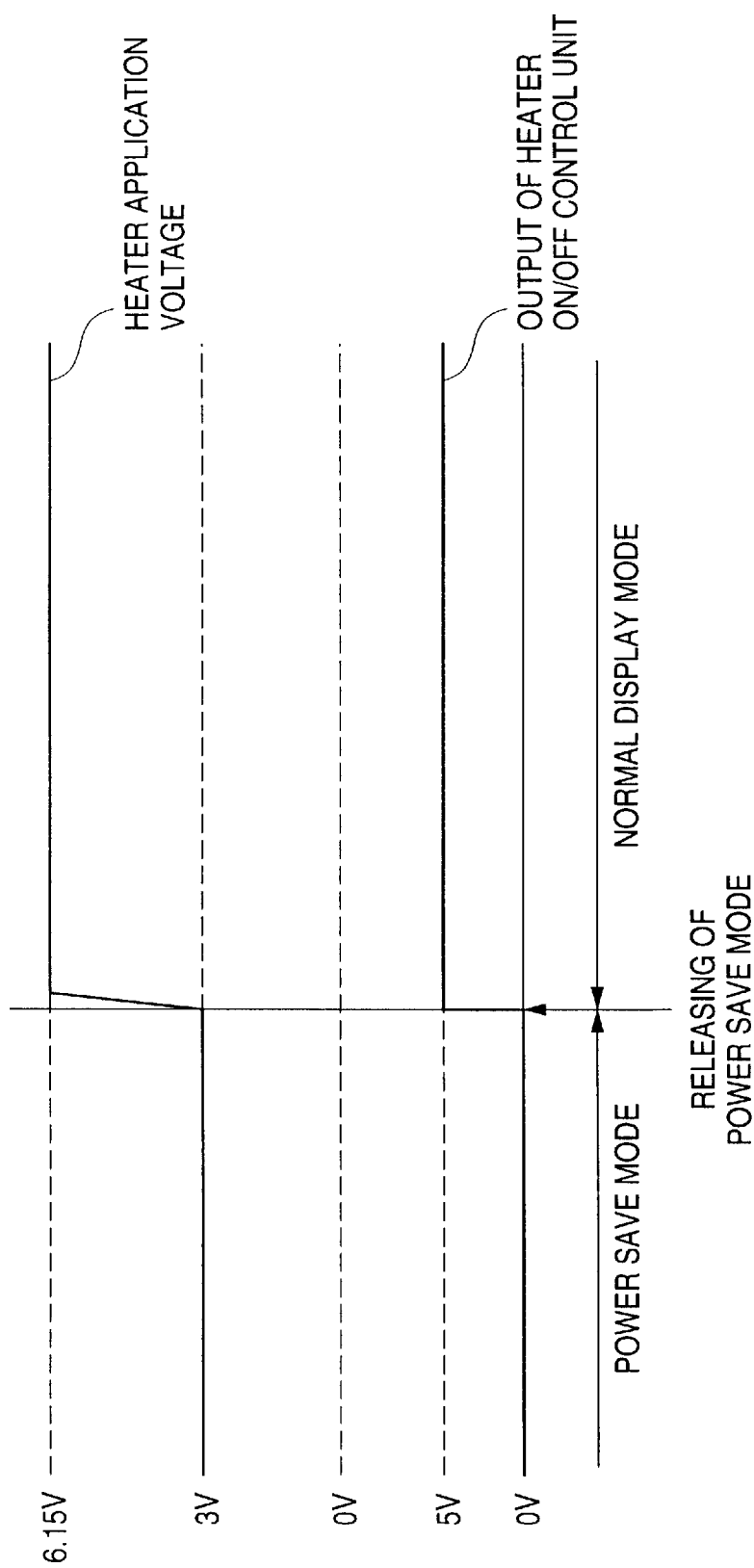
FIG. 20 is a timing chart for indicating a variation in heater application voltages before/after a power save mode is released in the conventional image display apparatus.

FIG. 17 graphically shows variations in waveforms of heater input voltages and effective values thereof before/after the power save mode is released. The power consumption may be reduced by reducing the duty ratio so as to lower the effective voltage of the heater application voltage to the heater 71 in the power save mode. When the power save mode is released, such a higher effective voltage than the heater application effective voltage is applied to the heater 71 in the normal display mode in response to the signal derived from the power save releasing process section 10 only by a time period "t". As a result, the heating speed of the heater 71 is increased to shorten the rising time of the screen, so that the set rising time of the screen can be realized.

Since the above-explained control operation is carried out, the high duty ratio can be achieved while the maximum value of the heater voltage in the normal display mode is suppressed to the low value although the switching control operation is performed. As a consequence, the switching loss can be reduced and furthermore, the heater voltage when the power save mode is released can be set to the higher heater voltage, so that the image appearing time can be further shortened.

Since the image display apparatus according to the present invention is arranged with the above-explained arrangements, the following effects can be achieved.

The image display apparatus according to the invention is comprised of: power save mode detecting means for detecting a power-save request or a power-save release; power consumption/image-appearing-time control means for controlling both power consumed in a power save mode and rising time of a screen when the power save mode is released; power supplying means for supplying electric power to a heater of a display unit on which an image is displayed; and heater-power-supplying control means for controlling the electric power supplied from the power supplying means based upon a control signal outputted from the power consumption/image-appearing-time control means so as to supply predetermined electric power to the heater of the display unit. As a result, both the power consumption in the power save mode and the rising time of the screen when the power save mode is released can be arbitrarily controlled.

In accordance with the control method of the image display apparatus of the present invention, there are provided: a setting step for setting both a power saving amount and rising time of a screen; a power-save detecting step for detecting either a power-save request or a power-save release; a calculating step for calculating a value of a first voltage applied to a heater in a power save mode, a value of a second voltage applied to the heater when the power save mode is released and application time of the first and second voltages based upon the set values; a control signal converting step for outputting a control signal based upon the first voltage value, the second voltage value, and the application time; and a heater-power-supplying control step for supplying predetermined electric power to the heater in response to the control signal. As a consequence, both the power consumption in the power save mode and the rising time of the screen when the power save mode is released can be arbitrarily controlled.

What is claimed is:

1. An image display apparatus comprising:
   power save mode detecting means for detecting a power-save request or a power-save release;
   power consumption/image-appearing-time control means for outputting, based on a power consumption in a power save mode being arbitrarily preset for every power save mode, and rising time of a screen when a power save mode is released being arbitrarily preset for every power save mode, a control signal which is able to realize said power consumption and said rising time of a screen;
   power supplying means for supplying electric power to a heater of a display unit on which an image is displayed; and
   heater-power-supplying control means for controlling the electric power supplied from said power supplying means based upon said control signal outputted from said power consumption/image-appearing-time control means so as to supply predetermined electric power to the heater of said display unit.

2. The image display apparatus as claimed in claim 1, wherein said power consumption/image-appearing-time control means includes:
   calculating means for calculating a value of a first voltage, a value of a second voltage, and application time of said first and second voltages based upon both the power consumed in the power save mode and also the rising time of the screen when the power save mode is released, said first voltage being applied to the heater in the power save mode, and said second voltage being applied to the heater when the power save mode is released, which is equal to a voltage applied to the heater in the normal display mode, or a voltage higher than said heater applied voltage; and
   control signal converting means for outputting a control signal based upon said first voltage value, said second voltage value, and said application time thereof.

3. The image display apparatus as claimed in claim 2, wherein said control signal converting means outputs such a control signal used to output the voltage switched from said heater-power-supplying control means.

4. The image display apparatus as claimed in claim 3, wherein said control signal converting means controls the heater voltage by varying a duty ratio of switching operation for said control signal.

5. The image display apparatus as claimed in claim 3, wherein said control signal converting means controls the heater voltage by varying OFF-time of switching operation for the control signal.

6. The image display apparatus as claimed in claim 3, wherein said control signal converting means controls the heater voltage by varying a total pulse number of switching operation within a constant time period of the control signal.

7. The image display apparatus as claimed in claim 3, wherein means for smoothing the switched voltage is provided between the heater and the heater-power-supplying control means.

8. The image display apparatus as claimed in claim 2, wherein said control signal converting means outputs a control signal used to cause a DC voltage to be outputted from said heater-power-supplying control means.

9. The image display apparatus as claimed in claim 1, wherein root-mean-square value detecting means for detecting a root-mean-square value of a voltage inputted to the heater is provided between the heater and the heater-power-supplying control means; and the detection value of said root-mean-square value detecting means is entered into said power consumption/image-appearing-time control means so as to control the electrical power supplied to the heater, while comparing a target value with the detection value.

10. The image display apparatus as claimed in claim 1, wherein said power supplying means includes at least a first voltage output terminal for a first voltage, and a second voltage output terminal for a second voltage higher than said first voltage; and said heater power supplying means receives the electric power supplied from said power supplying means, and controls the supply of the heater power by using the first voltage derived from said first voltage output terminal in the display mode and the power save mode, and by using the second voltage derived from said second voltage output terminal when the power save mode is released.

11. A method for controlling an image display apparatus, comprising:
   a setting step for arbitrarily setting a power consumption in a power save mode and rising time of a screen when a power save mode is released for every power save mode;
   a power-save detecting step for detecting either a power-save request or a power-save release;

a calculating step for calculating a value of a first voltage applied to a heater in a power save mode based on a set value relating to said power consumption, and a value and application time of a second voltage applied to said heater when a power save mode is released based on a set value relating to said rising time;

a control signal converting step for outputting a control signal based upon said first voltage value, said second voltage value, and said application time; and a heater-power-supplying control step for supplying predetermined electric power to the heater in response to said control signal.

12. The method for controlling an image display apparatus as claimed in claim 11, wherein said control signal converting step outputs a control signal used to output electric power switched at said heater-power-supplying control step.

* * * * *